US012659867B2

(12) United States Patent
Abotabl et al.

(10) Patent No.: US 12,659,867 B2
(45) Date of Patent: Jun. 16, 2026

(54) CONSIDERATIONS ON PUCCH POWER CONTROL IN FULL-DUPLEX NETWORKS

(71) Applicant: QUALCOMM Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 18/492,561

(22) Filed: Oct. 23, 2023

(65) Prior Publication Data

US 2025/0133506 A1     Apr. 24, 2025

(51) Int. Cl.
*H04W 52/10*      (2009.01)
*H04L 5/14*      (2006.01)
(Continued)

(52) U.S. Cl.
CPC .............. *H04W 52/10* (2013.01); *H04L 5/14* (2013.01); *H04W 16/28* (2013.01); *H04W 52/242* (2013.01)

(58) Field of Classification Search
CPC ... H04W 52/10; H04W 16/28; H04W 52/242; H04W 52/06; H04W 52/38; H04W 52/325; H04W 52/146; H04L 5/14
See application file for complete search history.

(56) References Cited

U.S. PATENT DOCUMENTS

2020/0229112 A1* 7/2020 John Wilson ....... H04W 52/146
2021/0266843 A1 8/2021 Abedini et al.
(Continued)

OTHER PUBLICATIONS

ETSI: "5G, NR, Radio Resource Control (RRC), Protocol Specification (3GPP TS 38.331 Version 17.6.0 Release 17)", ETSI TS 138 331, ETSI Technical Specification, European Telecommunications Standards Institute (ETSI), 650, Route Des Lucioles, F-06921 Sophia-Antipolis Cedex, France, vol. 3GPP RAN, No. V17.6.0, Oct. 11, 2023, 1309 Pages, XP014470349, p. 752-p. 753.
(Continued)

*Primary Examiner* — Diane D Mizrahi
(74) *Attorney, Agent, or Firm* — Holland & Hart LLP

(57) ABSTRACT

Methods, systems, and devices for wireless communications are described. A user equipment (UE) may receive an indication of a slot format configuration for a plurality of slots, where the plurality of slots includes one or more half-duplex slots and one or more full-duplex slots. The UE may receive control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation. The UE may transmit, during an uplink resource within the plurality of slots, an uplink message in accordance with the first one or more parameters or the second one or more parameters based on the slot format configuration.

30 Claims, 18 Drawing Sheets

(51) Int. Cl.
    *H04W 16/28*        (2009.01)
    *H04W 52/24*        (2009.01)

(56)             References Cited

U.S. PATENT DOCUMENTS

2023/0045623 A1\*   2/2023   Chen ..................... H04W 52/54
2023/0086946 A1\*   3/2023   Zhang ................ H04W 52/146
                                                     455/522

OTHER PUBLICATIONS

International Search Report and Written Opinion—PCT/US2024/044949—ISA/EPO—Dec. 16, 2024.

\* cited by examiner

Slot Format Configuration 320

Control Signaling 325

Uplink Communications 330

300

Control Signaling 325

| R | Serving Cell ID | | | BWP ID | Oct 1 |
|---|---|---|---|---|---|
| C | PUCCH Resource ID | | | | Oct 2 |
| R | HD/FD | Spatial Relation Info $ID_0$ | | | Oct 3 |
| R | HD/FD | Spatial Relation Info ID1 | | | Oct 4 |

•
•
•

| C | PUCCH Resource ID | | | | Oct 2N-3 |
|---|---|---|---|---|---|
| R | HD/FD | Spatial Relation Info $ID_0$ | | | Oct 2N-2 |
| R | HD/FD | Spatial Relation Info ID1 | | | Oct 2N-1 |

HD/FD Indication Bits 420

Communications Manager

Slot Format Component

1425

Receiver

1410

Control Signaling Component

1430

Transmitter

1415

Uplink Communication Component

1435

1420

1405

130    105    115

Network Entity

Transceiver

1610

Antenna

1615

Communications Manager

1620

Memory

Code

1630

1625

1640

Processor

1635

1605

1600

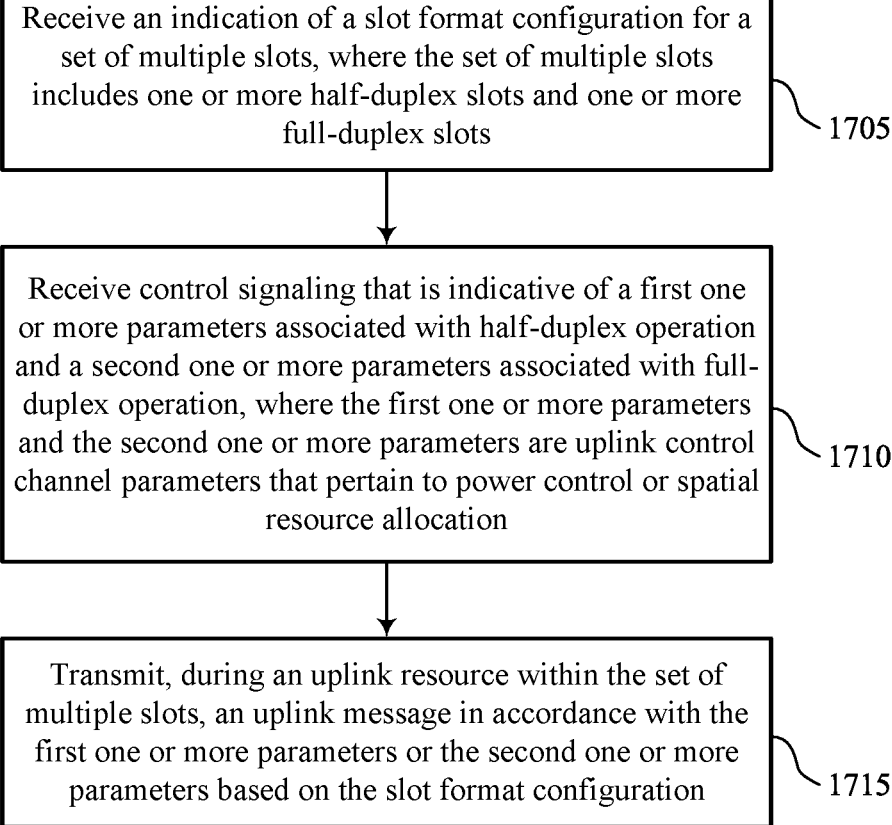

Receive an indication of a slot format configuration for a set of multiple slots, where the set of multiple slots includes one or more half-duplex slots and one or more full-duplex slots

1705

Receive control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation

1710

Transmit, during an uplink resource within the set of multiple slots, an uplink message in accordance with the first one or more parameters or the second one or more parameters based on the slot format configuration

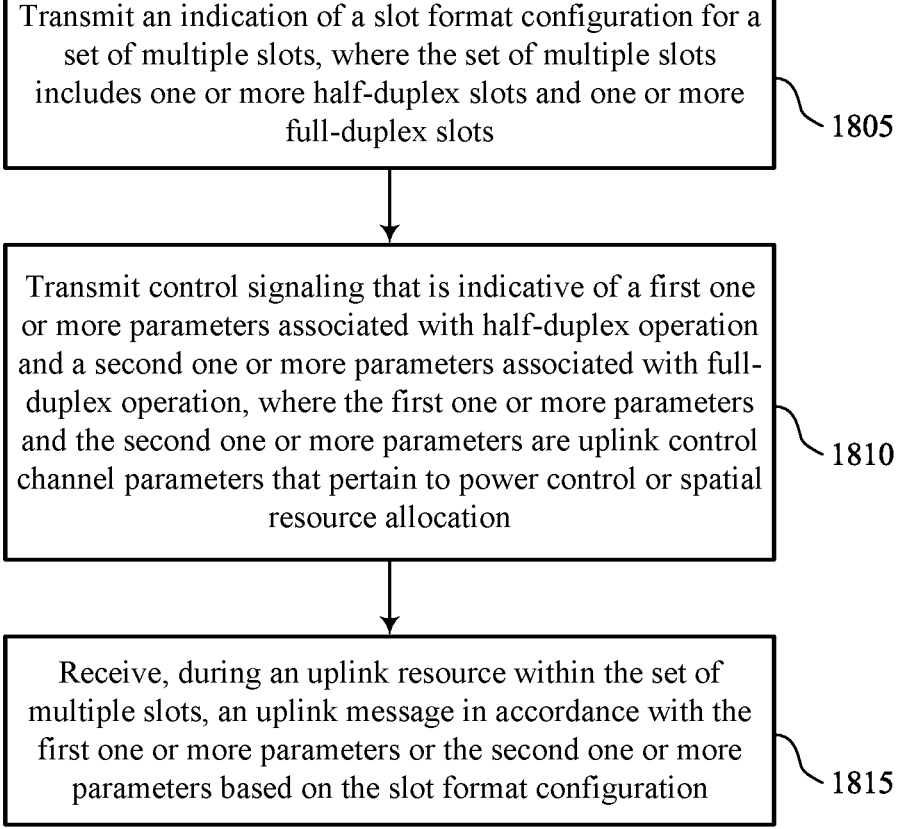

Transmit an indication of a slot format configuration for a set of multiple slots, where the set of multiple slots includes one or more half-duplex slots and one or more full-duplex slots                    1805

Transmit control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation                    1810

Receive, during an uplink resource within the set of multiple slots, an uplink message in accordance with the first one or more parameters or the second one or more parameters based on the slot format configuration                    1815

CONSIDERATIONS ON PUCCH POWER CONTROL IN FULL-DUPLEX NETWORKS

FIELD OF TECHNOLOGY

The following relates to wireless communications, including considerations on physical uplink control channel (PUCCH) power control in full-duplex networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless device may operate with half-duplex communications and full-duplex communications. However, such approaches may be improved.

SUMMARY

The described techniques relate to improved methods, systems, devices, and apparatuses that support considerations on physical uplink control channel (PUCCH) power control in full-duplex networks. For example, a user equipment (UE) may receive an indication of a slot format configuration for a plurality of slots, where the plurality of slots includes one or more half-duplex slots and one or more full-duplex slots. The UE may receive control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation. The UE may transmit, during an uplink resource within the plurality of slots, an uplink message in accordance with the first one or more parameters or the second one or more parameters based on the slot format configuration.

A method for wireless communications by a user equipment (UE) is described. The method may include receiving an indication of a slot format configuration for a set of multiple slots, where the set of multiple slots includes one or more half-duplex slots and one or more full-duplex slots, receiving control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation, and transmitting, during an uplink resource within the set of multiple slots, an uplink message in accordance with the first one or more parameters or the second one or more parameters based on the slot format configuration.

A UE for wireless communications is described. The UE may include one or more memories storing processor executable code, and one or more processors coupled with the one or more memories. The one or more processors may individually or collectively operable to execute the code to cause the UE to receive an indication of a slot format configuration for a set of multiple slots, where the set of multiple slots includes one or more half-duplex slots and one or more full-duplex slots, receive control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation, and transmit, during an uplink resource within the set of multiple slots, an uplink message in accordance with the first one or more parameters or the second one or more parameters based on the slot format configuration.

Another UE for wireless communications is described. The UE may include means for receiving an indication of a slot format configuration for a set of multiple slots, where the set of multiple slots includes one or more half-duplex slots and one or more full-duplex slots, means for receiving control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation, and means for transmitting, during an uplink resource within the set of multiple slots, an uplink message in accordance with the first one or more parameters or the second one or more parameters based on the slot format configuration.

A non-transitory computer-readable medium storing code for wireless communications is described. The code may include instructions executable by a processor to receive an indication of a slot format configuration for a set of multiple slots, where the set of multiple slots includes one or more half-duplex slots and one or more full-duplex slots, receive control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation, and transmit, during an uplink resource within the set of multiple slots, an uplink message in accordance with the first one or more parameters or the second one or more parameters based on the slot format configuration.

In some examples of the method, user equipment (UEs), and non-transitory computer-readable medium described herein, the control signaling includes an activating medium access control (MAC) control element (CE) that includes a first identification associated with the first one or more parameters and a second identification associated with the second one or more parameters, the first identification may be an uplink control channel spatial relationship information identification that may be associated with half-duplex operation, and the second identification may be an uplink control channel spatial relationship information identification that may be associated with full-duplex operation.

In some examples of the method, user equipment (UEs), and non-transitory computer-readable medium described herein, the control signaling includes a first field that indicates that the first identification may be associated with the half-duplex operation and a second field indicating the second identification may be associated with the full-duplex operation.

Some examples of the method, user equipment (UEs), and non-transitory computer-readable medium described herein may further include operations, features, means, or instructions for determining that the first identification may be associated with the half-duplex operation and that the second identification may be associated with the full-duplex operation based on an order of the first identification and the second identification in the control signaling.

In some examples of the method, user equipment (UEs), and non-transitory computer-readable medium described herein, the control signaling includes an information element (IE) that may be an uplink control channel spatial relationship information IE, where the first one or more parameters and the second one or more parameters may be identified in the uplink control channel spatial relationship information IE, and where the first one or more parameters includes a first open loop power control parameter for half-duplex operation, a first pathloss reference signal parameter for half-duplex operation, or both, and the second one or more parameters includes a second open loop power control parameter for full-duplex operation, a second pathloss reference signal parameter for full-duplex operation, or both.

In some examples of the method, user equipment (UEs), and non-transitory computer-readable medium described herein, the control signaling includes an information element (IE) that may be an uplink control channel spatial relationship information IE that includes a single set of parameters representative of both the first one or more parameters and the second one or more parameters, and where the single set of parameters includes an open loop power control parameter for both half-duplex operation and full-duplex operation, and a pathloss reference signal parameter for both half-duplex operation and full-duplex operation.

In some examples of the method, user equipment (UEs), and non-transitory computer-readable medium described herein, the control signaling includes, in an uplink control channel power control information element (IE), a single set of open loop power control parameters that includes the first one or more parameters and the second one or more parameters, or a single set of pathloss reference signal parameters that includes the first one or more parameters and the second one or more parameters, or both.

In some examples of the method, user equipment (UEs), and non-transitory computer-readable medium described herein, the control signaling includes, in an uplink control channel power control information element (IE), a first set of open loop power control parameters or a first set of pathloss reference signal parameters, or both, that include the first one or more parameters, and where the control signaling includes a second set of open loop power control parameters or a second set of pathloss reference signal parameters, or both, that include the second one or more parameters.

A method for wireless communications by a network entity is described. The method may include transmitting an indication of a slot format configuration for a set of multiple slots, where the set of multiple slots includes one or more half-duplex slots and one or more full-duplex slots, transmitting control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation, and receiving, during an uplink resource within the set of multiple slots, an uplink message in accordance with the first one or more parameters or the second one or more parameters based on the slot format configuration.

A network entity for wireless communications is described. The network entity may include one or more memories storing processor executable code, and one or more processors coupled with the one or more memories. The one or more processors may individually or collectively operable to execute the code to cause the network entity to transmit an indication of a slot format configuration for a set of multiple slots, where the set of multiple slots includes one or more half-duplex slots and one or more full-duplex slots, transmit control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation, and receive, during an uplink resource within the set of multiple slots, an uplink message in accordance with the first one or more parameters or the second one or more parameters based on the slot format configuration.

Another network entity for wireless communications is described. The network entity may include means for transmitting an indication of a slot format configuration for a set of multiple slots, where the set of multiple slots includes one or more half-duplex slots and one or more full-duplex slots, means for transmitting control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation, and means for receiving, during an uplink resource within the set of multiple slots, an uplink message in accordance with the first one or more parameters or the second one or more parameters based on the slot format configuration.

A non-transitory computer-readable medium storing code for wireless communications is described. The code may include instructions executable by a processor to transmit an indication of a slot format configuration for a set of multiple slots, where the set of multiple slots includes one or more half-duplex slots and one or more full-duplex slots, transmit control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation, and receive, during an uplink resource within the set of multiple slots, an uplink message in accordance with the first one or more parameters or the second one or more parameters based on the slot format configuration.

In some examples of the method, network entities, and non-transitory computer-readable medium described herein, the control signaling includes an activating medium access control (MAC) control element (CE) that includes a first identification associated with the first one or more parameters and a second identification associated with the second one or more parameters, the first identification may be an uplink control channel spatial relationship information identification that may be associated with half-duplex operation, and the second identification may be an uplink control channel spatial relationship information identification that may be associated with full-duplex operation.

In some examples of the method, network entities, and non-transitory computer-readable medium described herein, the control signaling includes a first field that indicates that the first identification may be associated with the half-duplex operation and a second field indicating the second identification may be associated with the full-duplex operation.

In some examples of the method, network entities, and non-transitory computer-readable medium described herein, the control signaling includes an information element (IE) that may be an uplink control channel spatial relationship information IE, where the first one or more parameters and the second one or more parameters may be identified in the uplink control channel spatial relationship information IE, and where the first one or more parameters includes a first open loop power control parameter for half-duplex operation, a first pathloss reference signal parameter for half-duplex operation, or both, and the second one or more parameters includes a second open loop power control parameter for full-duplex operation, a second pathloss reference signal parameter for full-duplex operation, or both.

In some examples of the method, network entities, and non-transitory computer-readable medium described herein, the control signaling includes an information element (IE) that may be an uplink control channel spatial relationship information IE that includes a single set of parameters representative of both the first one or more parameters and the second one or more parameters, and where the single set of parameters includes an open loop power control parameter for both half-duplex operation and full-duplex operation, and a pathloss reference signal parameter for both half-duplex operation and full-duplex operation.

In some examples of the method, network entities, and non-transitory computer-readable medium described herein, the control signaling includes, in an uplink control channel power control information element (IE), a single set of open loop power control parameters that includes the first one or more parameters and the second one or more parameters, or a single set of pathloss reference signal parameters that includes the first one or more parameters and the second one or more parameters, or both.

In some examples of the method, network entities, and non-transitory computer-readable medium described herein, the control signaling includes, in an uplink control channel power control information element (IE), a first set of open loop power control parameters or a first set of pathloss reference signal parameters, or both, that include the first one or more parameters, and where the control signaling includes a second set of open loop power control parameters or a second set of pathloss reference signal parameters, or both, that include the second one or more parameters.

BRIEF DESCRIPTION OF THE DRAWINGS

FIG. 4 shows an example of a wireless communications scheme that supports considerations on PUCCH power control in full-duplex networks in accordance with one or more examples as disclosed herein.

FIGS. 17 and 18 show flowcharts illustrating methods that support considerations on PUCCH power control in full-duplex networks in accordance with one or more examples as disclosed herein.

DETAILED DESCRIPTION

Figure 1:
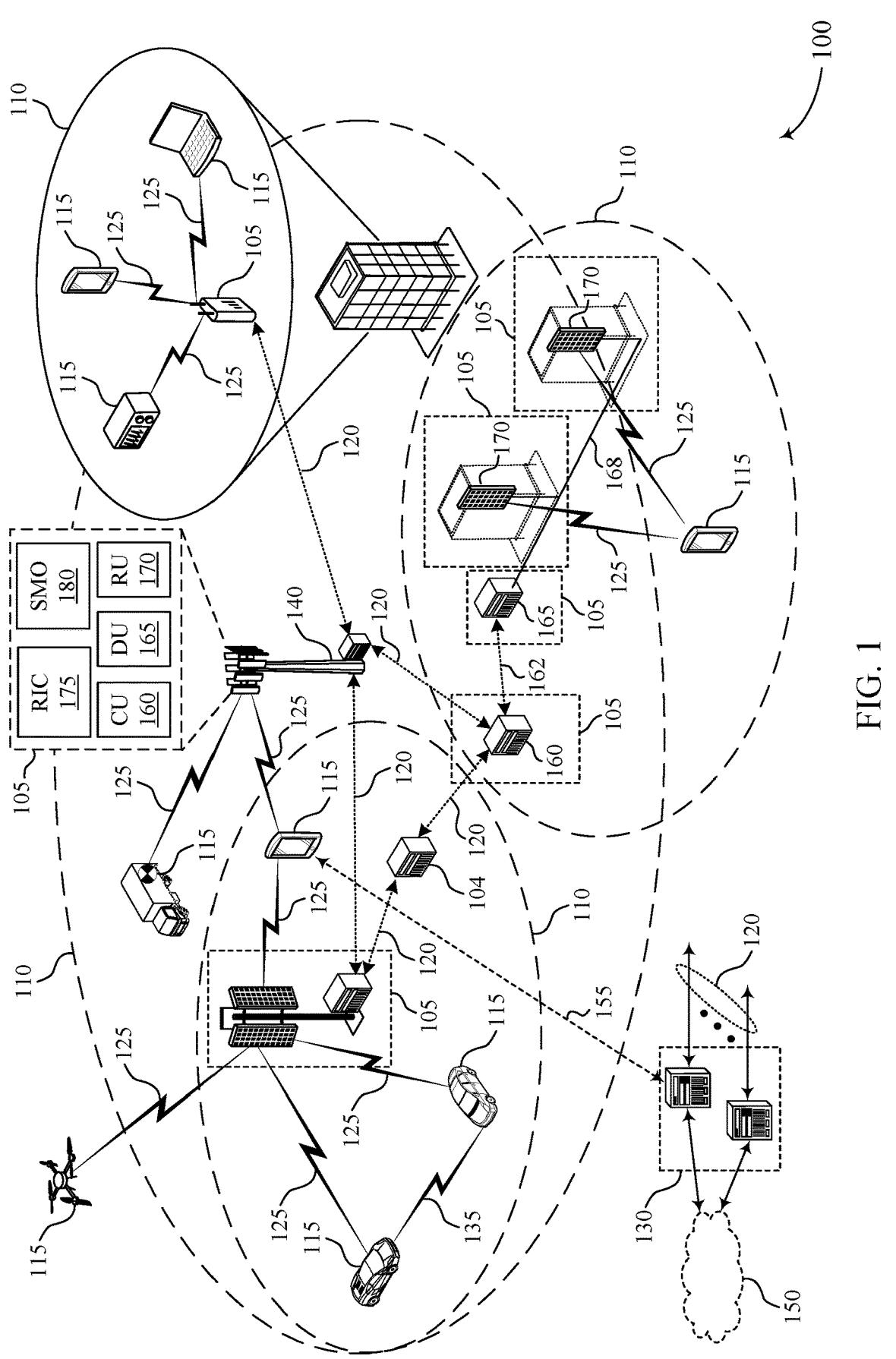
FIG. 1 shows an example of a wireless communications system that supports considerations on physical uplink control channel (PUCCH) power control in full-duplex networks in accordance with one or more examples as disclosed herein.

In wireless communications, both full-duplex (FD) and half-duplex (HD) operation may be used and slots may be associated with such different operations, such as FD and HD. For example, for a given uplink resource (e.g., an uplink control channel resource), uplink power control, spatial resource allocation, or both, may be different for FD slots and HD slots. For example, in an HD slot, a network entity may use a first portion of an antenna array or panel for reception, while in a FD slot, the network entity may use a differently-sized (e.g., smaller) portion of the antenna array for reception. Further, in a FD slot, the possibility exists for increased interference as compared with a HD slot. However, some approaches do not account for such differences between FD and HD slots and apply the same parameters (e.g., power control parameters, spatial resource allocation parameters, or both) regardless of whether the slot is FD or HD, resulting in decreased communications quality and limits opportunities to improve power control, spatial resource allocation, or both.

Techniques for power control, spatial resource allocation, or both may be employed. For example, a user equipment (UE) may receive an indication of a slot format configuration and may receive one or more parameters for power control, spatial resource allocation, or both within slots of the slot format configuration, where the slot format configuration may indicate FD slots, HD slots, or both that are to be used for communications between the UE and a network entity. In some examples, such parameters may include multiple spatial relationship parameters (e.g., one for FD operation and another for HD operation). In some examples, such parameters may indicate different IDs of associated power control parameters, pathloss parameters, or both (e.g., one each for FD operation and another for HD operation for the power control parameters, one each for FD operation and another for HD operation for the pathloss parameters, or both). In some examples, such power control parameters, pathloss parameters, or both, may include or be associated with multiple values, where some values may be for FD operation and others for HD operation (e.g., one of each). In some examples, the one or more parameters may indicate power control parameters, pathloss parameters, or both, from among different sets of power control parameters, pathloss parameters, or both, where different sets may for FD operation or HD operation. In this way, communications quality and flexibility may be increased, as the UE and the network entity may communicate in FD and HD slots using power control parameters, pathloss parameters, or both, that are better suited for FD operation or HD operation.

Aspects of the disclosure are initially described in the context of wireless communications systems. Aspects of the disclosure are then described with reference to wireless communications schemes, a wireless communications system, and a process flow. Aspects of the disclosure are further illustrated by and described with reference to apparatus diagrams, system diagrams, and flowcharts that relate to considerations on PUCCH power control in full-duplex networks.

FIG. 1 shows an example of a wireless communications system 100 that supports considerations on physical uplink control channel (PUCCH) power control in full-duplex networks in accordance with one or more examples as disclosed herein. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support considerations on PUCCH power control in full-duplex networks as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, a UE 115 and a network entity 105 may support one or more signaling- or configuration-based mechanisms according to which the UE 115 and the network entity 105 may operate in HD operations, FD operations, or both. For example, the network entity 105 may transmit, to the UE 115, a slot format configuration or other indication of which slots may be designated for HD operations and which slots may be designated for FD operations. The network entity 105 may transmit control signaling that may include parameters for HD operations, parameters for FD operations, or both. In some examples, the parameters (be they for HD operation, FD operation, or both) may be association with power control, spatial resource allocation, or both. The UE 115 may then operate in the various slots (e.g., HD slots and FD slots) using the different parameters (e.g., using HD-associated parameters in HD slots and using FD-associated parameters in FD slots). In this way, communications quality and flexibility may be increased, as the UE and the network entity may communicate in FD and HD slots using power control parameters, pathloss parameters, or both, that are better suited for FD operation or HD operation.

Figure 2:
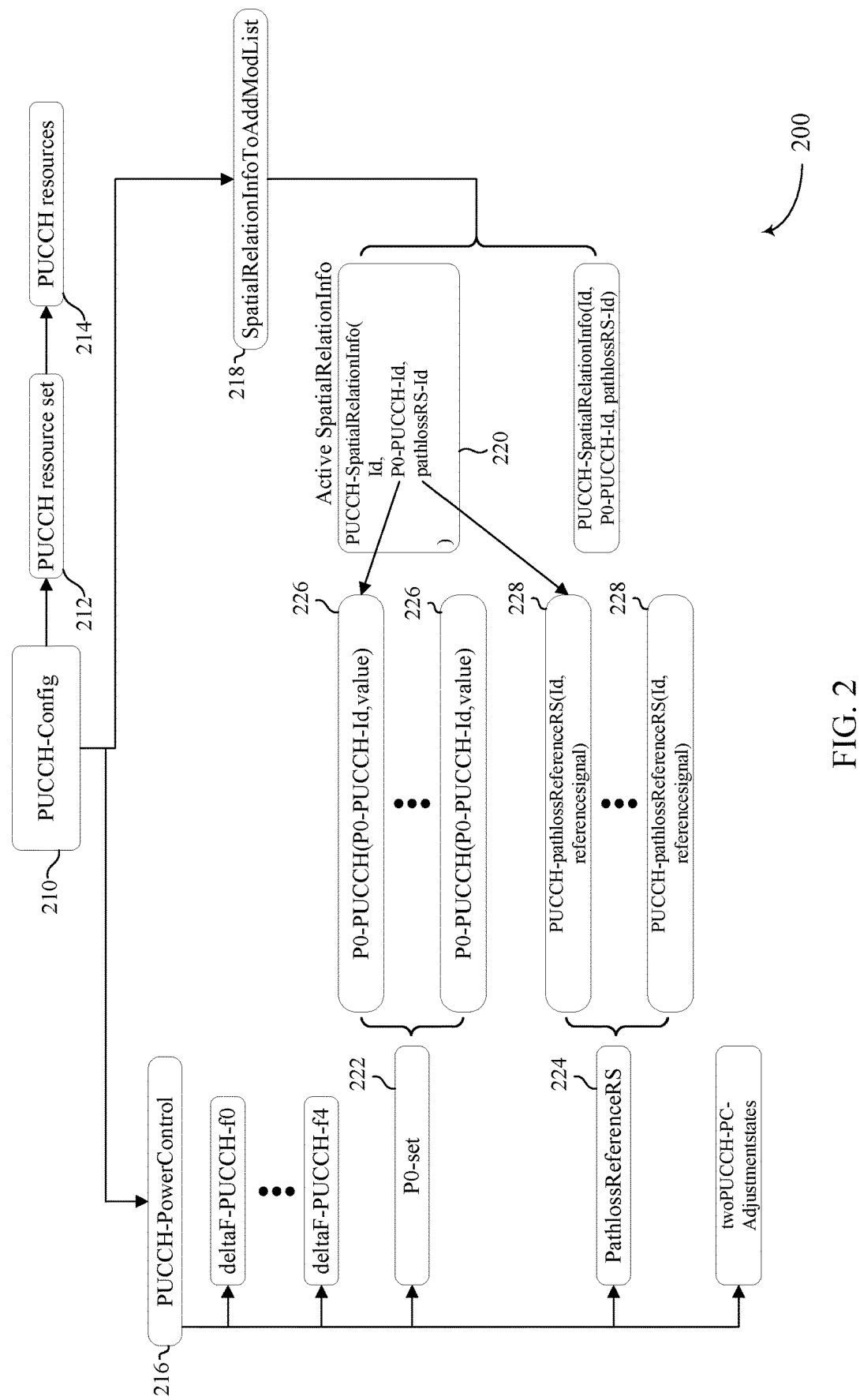
FIG. 2 shows an example of a wireless communications scheme that supports considerations on PUCCH power control in full-duplex networks in accordance with one or more examples as disclosed herein.

FIG. 2 shows an example of a wireless communications scheme 200 that supports considerations on PUCCH power control in full-duplex networks in accordance with one or more examples as disclosed herein.

In wireless communications, a UE may transmit uplink communications (e.g., control channel communications or shared channel communications) in accordance with an uplink configuration 210, of which a PUCCH-Config may be one example. The uplink configuration 210 may indicate a resource set 212 (of which a PUCCH resource set may be an example) which may in turn indicate or include uplink resources 214 (of which PUCCH resources may be one example). The uplink configuration 210 may include or indicate a power control element 216 (of which PUCCH-PowerControl may be an example). The power control element 216 may indicate power control parameter sets 222 (of which P0-set may be an example) that may include or indicate power control parameters 226 (of which P0-PUCCH may be an example). The power control element 216 may further include or indicate pathloss reference signal parameter sets 224 (of which PathlossReferenceRS may be an example) that may include or indicate pathloss reference signal parameters 228 (of which PUCCH-pathlossreferenceRS may be an example).

One or more of the power control parameters 226, one or more of the pathloss reference signal parameters 228, or any combination thereof, may be selected or indicated for use for the UE to perform one or more power control operations, spatial resource allocation operations, or any combination thereof. For example, the uplink configuration 210 may further include or indication a spatial relation element 218 (e.g., of which SpatialRelationInfoToAddModList may be an example). The spatial relation element 218 may include or indicate a spatial relation information parameter 220 that may indicate one or more identifiers associated with one or more power control parameters 226, one or more pathloss reference signal parameters 228, or any combination thereof, that are to be used by the UE for uplink transmissions.

For example, in some cases, a UE may perform one or more power control operations in accordance with a formula or rule, and the selection or indication of power control parameters 226, pathloss reference signal parameters 228, or both, may determine or influence values or other aspects of one or more terms used in the formula or rule. For example, the spatial relation information parameter 220 may include multiple identifiers, such as a first identifier that may correspond to a first power control parameter 226 that may carry or be associated with the same first identifier, as well as a second identifier that may correspond to a first pathloss reference signal parameter 228 that may carry or be associated with the same second identifier. Such a power control parameter 226 may indicate a power control value (e.g., a P0 value) that may be used to calculate one or more aspects of a power control operation and such a pathloss reference signal parameter 228 may identify a reference signal that is to be used to calculate a pathloss associated with the power control operation. Such a hierarchy may be used to adapt uplink transmission power based on a transmission beam.

In some examples, control signaling (e.g., medium access control control element (MAC-CE) control signaling) may be used to activate a spatial relation information parameter 220 (e.g., PUCCH-spatialrelationinfo) for uplink resources 214. In some examples, different types of control signaling may be used for such a purpose. For example, a first type or instance of control signaling may activate a spatial relation information parameter 220 (e.g., PUCCH-Spatialrelationinfo) for a given uplink resource. A second type or instance of control signaling may activate a spatial relation information parameter 220 (e.g., PUCCH-spatialrelationinfo) for an uplink resource, and the second type or instance of control signaling may include N such activations. A third type or instance of control signaling may activate multiple (e.g., two) spatial relation information parameters 220 (e.g., PUCCH-spatialrelationinfo) for each uplink resource for a total of N resources.

In the course of wireless communications, some slots in which the UE is to communicate may be HD slots and some slots may be FD slots and such an arrangement may be indicated in a slot format configuration. For example, an uplink resource may be defined or selected to have a periodicity that might result in the resource falling within or being associated with an HD slot or an FD slot. In some examples, a network entity or other device may not be permitted to select or define a slot format or scheduling configuration to make some resources fall in HD slots and other resources fall in FD slots.

For a given uplink resource, it may be desirable to transmit uplink transmissions with different power control parameters or values if the uplink resource falls in an HD slot versus an FD slots. For example, in an HD slot, a receiving device may use an entire antenna panel for reception of the uplink transmission, while in an FD, the receiving device may employ a reduced portion (e.g., one half) of an antenna panel for reception, thereby losing processing gain. Further, in an FD slot, more interference, such as CLI and SI, could occur at the transmitting device, the receiving device, or both.

However, in some approaches, such adaptations may not be made or may not be possible, as activating a spatial relation information parameter (e.g., PUCCH-spatialrelationinfo) for an uplink occasion may result in the same parameters being applied for communications regardless of whether the communications occur in an HD slot or an FD slot, thus limiting uplink power control improvements. Thus, improvements that adapt uplink power control based on a slot type may be desirable to improve antenna panel utilization and processing gain, reduce interference, and improve communications quality and reliability.

Figure 3:
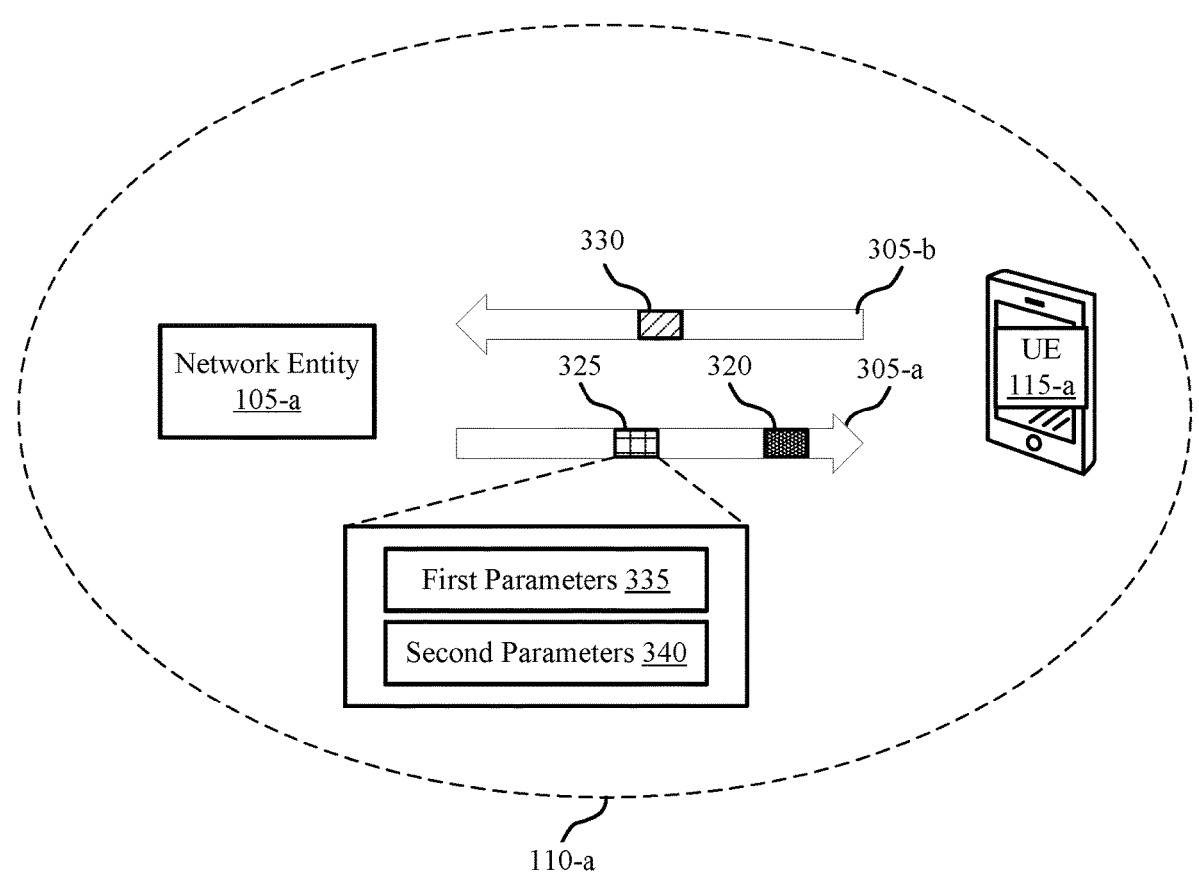
FIG. 3 shows an example of a wireless communications system that supports considerations on PUCCH power control in full-duplex networks in accordance with one or more examples as disclosed herein.
Figure 3:
Figure 3:
Figure 3:

FIG. 3 shows an example of a wireless communications system 300 that supports considerations on PUCCH power control in full-duplex networks in accordance with one or more examples as disclosed herein.

The wireless communications system 300 may include a network entity 105-a that may be an example of the one or more of the network entities 105 discussed in relation to other figures. The wireless communications system 300 may include UE 115-a that may be an example of UE 115 discussed in relation to other figures. In some examples, the UE 115-a may be located in a geographic coverage area 110-a that may be associated with the network entity 105-a. The network entity 105-a and UE 115-a may communicate via one or more downlink communication links 305-a and one or more uplink communication links 305-b.

The UE 115-a and the network entity 105-a may perform one or more operations for communicating using HD operations, FD operations, or both. For example, the UE 115-a may receive (e.g., from the network entity 105-a) a slot format configuration 320. The slot format configuration 320 may indicate one or more slots and associated formats for those slots. For example, some slots may be designated as HD slots and other slots may be designated as FD slots. By receiving and parsing the slot format configuration 320, the UE 115-a may determine which slots are HD slots and which slots are FD slots and perform communications operations accordingly.

The UE 115-a may receive the control signaling 325 that may indicate one or more parameters, such as the first parameters 335 and the second parameters 340. In some examples, the first parameters 335 may be associated with FD operation and the second parameters 340 may be associated with HD operation. In some examples, the first parameters 335, the second parameters 340, or both may pertain to power control operations, spatial resource allocation, or both. For example, the first parameters 335 may include, define, select, or otherwise be associated with one or more power control values (e.g., a P0 value) that may be used in a calculation or determination of a power with which the UE 115-*a* is to transmit uplink communications in FD operation and the second parameters 340 may include, define, select, or otherwise be associated with one or more power control values (e.g., a P0 value) that may be used in a calculation or determination of a power with which the UE 115-*a* is to transmit uplink communications in HD operation. Additionally, or alternatively, the first parameters 335, the second parameters 340, or both may be associated with or pertain to one or more aspects of spatial resource allocation. For example, the first parameters 335, the second parameters 340, or both, may be indicative of or pertain to one or more beams, directions, or other aspects of spatial resource allocation. Different combinations of the first parameters 335 and the second parameters 340 may be employed (e.g., as described throughout).

In different scenarios, applications, or implementations, one or more of the first parameters 335, the second parameters 340, or both may be one or more of the parameters discussed herein, including the power control element 216 (e.g., of which PUCCH-PowerControl may be an example), the spatial relation element 218 (e.g., of which SpatialRelationInfoToAddModList may be an example), the spatial relation information parameter 220 (of which PUCCH-SpatialRelationInfo may be an example), the power control parameter set 222 (e.g., of which P0-set may be an example), the pathloss reference signal parameter set 224 (e.g., of which PathlossReferenceRS may be an example), the power control parameter 226 (e.g., of which P0-PUCCH may be an example), the pathloss reference signal parameter 228 (e.g., of which PUCCH-pathlossReferenceRS may be an example), or any combination thereof.

The UE 115-*a* may transmit the uplink communications 330 to the network entity 105-*a* in one or more of the slots indicated in the slot format configuration 320 and the UE 115-*a* may do so in accordance with one or more of the first parameters 335, the second parameters 340, or both. For example, the UE 115-*a* may transmit the uplink communications 330 using a power level determined based on the first parameters 335, the second parameters 340, or both (e.g., one or more values indicated by the first parameters 335, the second parameters 340, or both may be used in an equation to determine the power level). Similarly, the UE 115-*a* may transmit the uplink communications 330 in accordance with a spatial resource allocation determined based on the first parameters 335, the second parameters 340, or both.

FIG. 4 shows an example of a wireless communications scheme 400 that supports considerations on PUCCH power control in full-duplex networks in accordance with one or more examples as disclosed herein.

In some examples, more than one spatial relation information parameter 220 may be activated for a same uplink resource. For example, a first spatial relation information parameter 220 may be activated for use by the UE 115-*a* for cases in which an uplink occasion falls within a slot designated for HD operation and a second spatial relation information parameter 220 may be activated for use by the UE 115-*a* for cases in which an uplink occasion falls within a slot designated for FD operation. In some examples, the activation of such multiple spatial relation information parameters 220 may be performed or indicated with control signaling (e.g., MAC-CE signaling) for a given scenario, such as a scenario involving the use of multiple transmission-reception points (TRPs).

In some examples, the control signaling 325 may indicate the multiple spatial relation information parameters 220 using one or more bits, such as the HD/FD indication bits 420. The HD/FD indication bits 420 may be used to indicate that the multiple activated spatial relation information parameters 220 are used for HD or FD. In some examples, a default order of indication of the spatial relation information parameter 220 in the signaling 325 may be employed. For example, a first indication of a spatial relation information parameter 220 (e.g., corresponding to Oct 3) may be associated with HD operation and a second indication of a spatial relation information parameter 220 (e.g., corresponding to Oct 4) may be associated with FD operation.

Figure 5:
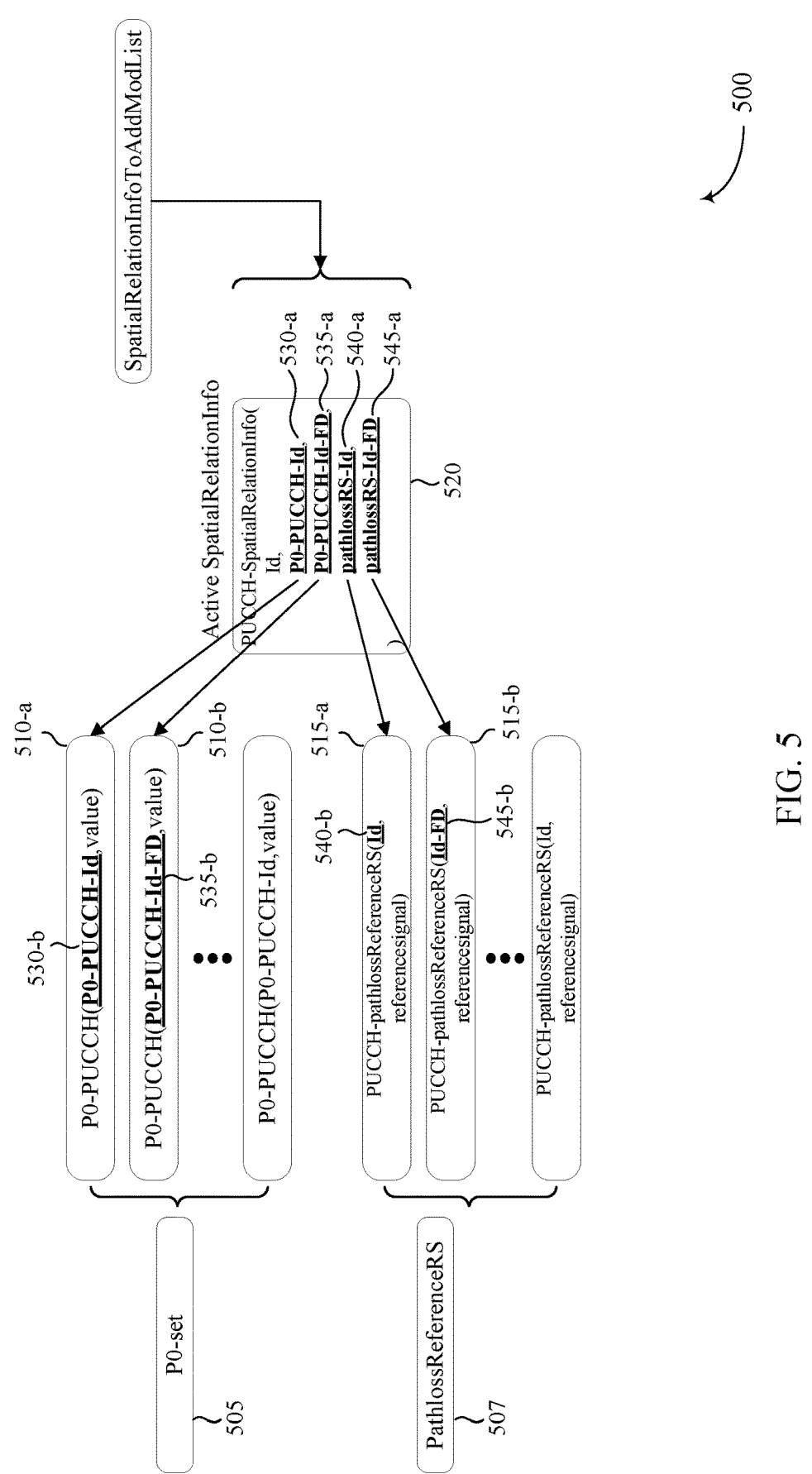
FIG. 5 shows an example of a wireless communications scheme that supports considerations on PUCCH power control in full-duplex networks in accordance with one or more examples as disclosed herein.

FIG. 5 shows an example of a wireless communications scheme 500 that supports considerations on PUCCH power control in full-duplex networks in accordance with one or more examples as disclosed herein.

In some examples, multiple power control parameters 510 (e.g., associated with a power control parameter set 505), multiple pathloss reference signal parameters 515 (e.g., associated with a pathloss reference signal parameter set 507), or any combination thereof may be employed, and one or more such parameters may be associated respective identifiers that may be associated with either HD operation or FD operation. For example, the power control parameter 510-*a* may include or be associated with identifier 530-*b* (e.g., which may be associated with HD operation) and the power control parameter 510-*b* may include or be associated with identifier 530-*b* (e.g., which may be associated with FD operation). Similarly, the pathloss reference signal parameter 515-*a* may include or be associated with identifier 540-*b* (e.g., which may be associated with HD operation) and the pathloss reference signal parameter 515-*b* may include or be associated with identifier 545-*b* (e.g., which may be associated with FD operation).

In some examples, the spatial relation information parameter 520 may include or indicate multiple identifiers that may correspond to identifiers included in or associated with the power control parameter 510-*a*, power control parameter 510-*b*, pathloss reference signal parameter 515-*a*, and pathloss reference signal parameter 515-*b*. For example, the spatial relation information parameter 520 may include or indicate identifier 530-*a* (which may correspond with identifier 530-*b*), identifier 535-*a* (which may correspond with identifier 535-*b*), identifier 540-*a* (which may correspond with identifier 535-*b*), and identifier 545-*a* (which may correspond with identifier 545-*b*). In this way, the spatial relation information parameter 520 may include or indicate multiple identifiers associated with power control parameters 510 and multiple identifiers associated with pathloss reference signal parameters 515. In some examples, the identifier 530-*b* and identifier 540-*b* may be identifiers associated with operation in schemes that do not account for differences between HD operation and FD operation and the identifier 535-*b* and the identifier 545-*b* may be identifiers that may not be used in schemes not accounting for differences between HD operation and FD operation. In some examples, if the identifier 535-*a*, the identifier 545-*a*, one or more other identifiers associated with FD operation, or any combination thereof are not included in the spatial relation information parameter 520, the identifier 530-*a* and the identifier 540-*a* may indicate the associated power control parameter(s) 510 and pathloss reference signal parameters 515 to be used for both HD operation and FD operation.

Figure 6:
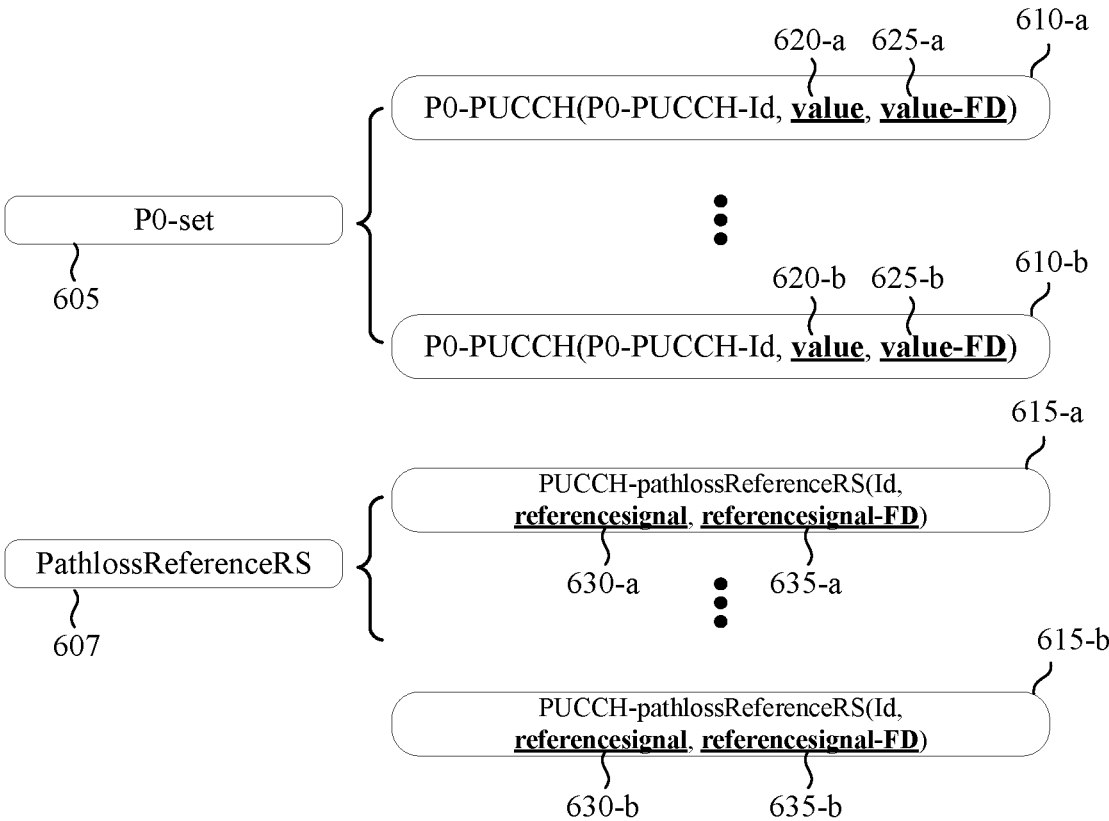
FIG. 6 shows an example of a wireless communications scheme that supports considerations on PUCCH power control in full-duplex networks in accordance with one or more examples as disclosed herein.

FIG. 6 shows an example of a wireless communications scheme 600 that supports considerations on PUCCH power control in full-duplex networks in accordance with one or more examples as disclosed herein.

In some examples, the power control parameters 610 (e.g., associated with a power control parameter set 605), the pathloss reference signal parameters 615 (e.g., associated with a pathloss reference signal parameter set 607), or both may include multiple values (e.g., one or more values associated with HD operation, one or more values associated with FD operation, or both). For example, the power control parameter 610-*a* may include or indicate multiple values, such as the value 620-*a* (e.g., which may be associated with HD operation) and the value 625-*a* (e.g., which may be associated with FD operation). Similarly, the power control parameter 610-*b* may include or indicate multiple values, such as the value 620-*b* (e.g., which may be associated with HD operation) and the value 625-*b* (e.g., which may be associated with FD operation). One or more pathloss reference signal parameters 615 may be configured or arranged similarly. For example, the pathloss reference signal parameter 615-*a* may include or indicate multiple values, such as the value 630-*a* (e.g., which may be associated with HD operation) and the value 635-*a* (e.g., which may be associated with FD operation). Similarly, the pathloss reference signal parameter 615-*b* may include or indicate multiple values, such as the value 630-*b* (e.g., which may be associated with HD operation) and the value 635-*b* (e.g., which may be associated with FD operation).

In some examples, a spatial relation information parameter (e.g., that indicates which power control parameters 610, pathloss reference signal parameters 615, or both that a UE is to use for communications) may include or indicate identifiers associated with the power control parameters 610, the pathloss reference signal parameters 615, or both. The UE may then select the value that corresponds to an operation mode corresponding with slot format information. For example, if the UE is to communicate using HD operation, the UE may employ the value 620-*a*, the value 620-*b*, the value 630-*a*, the value 630-*b*, or any combination thereof, as such values may be associated with HD operation. Similarly, if the UE is to communicate using FD operation, the UE may employ the value 625-*a*, the value 625-*b*, the value 635-*a*, the value 635-*b*, or any combination thereof, as such values may be associated with FD operation.

Figure 7:
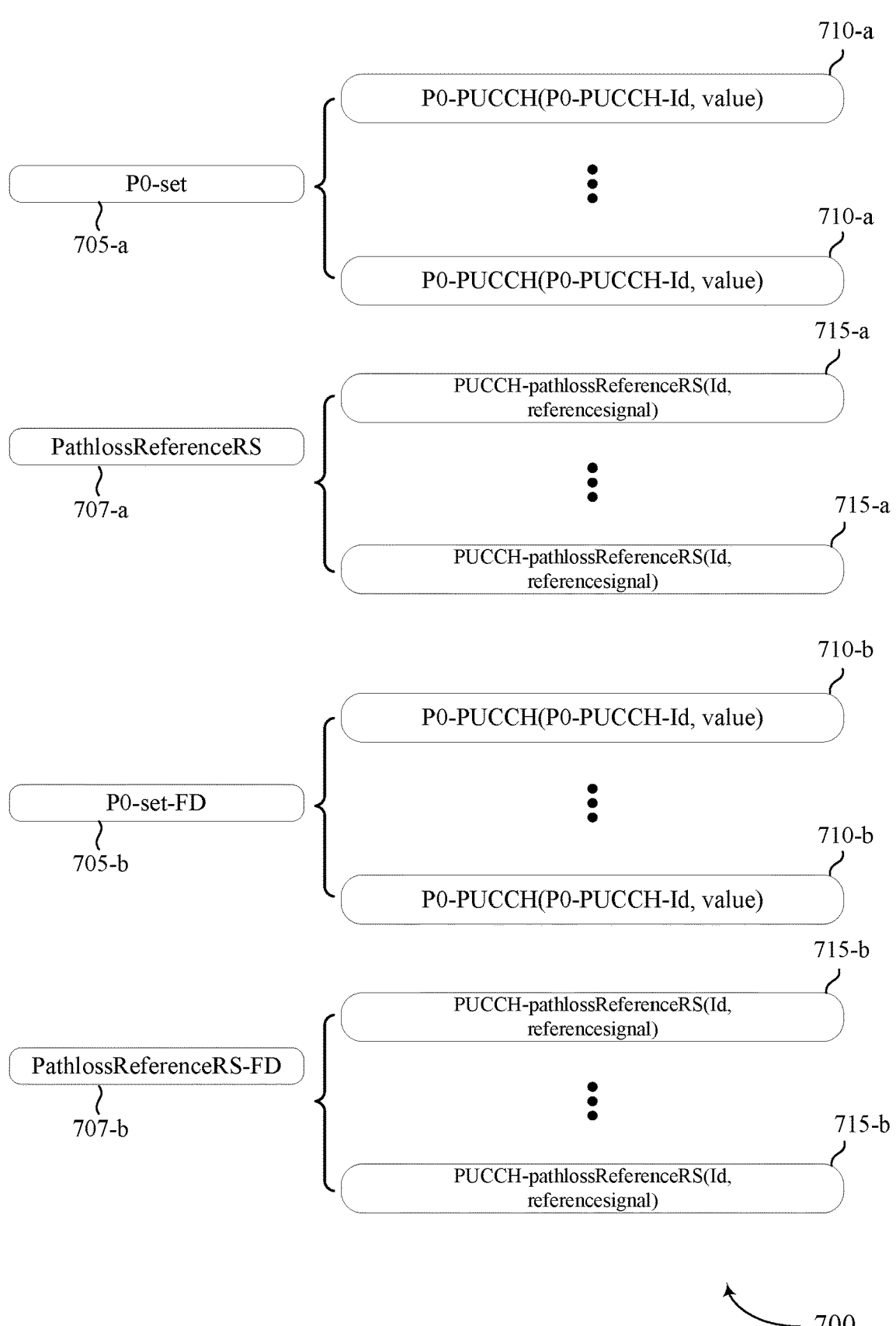
FIG. 7 shows an example of a wireless communications scheme that supports considerations on PUCCH power control in full-duplex networks in accordance with one or more examples as disclosed herein.

FIG. 7 shows an example of a wireless communications scheme 700 that supports considerations on PUCCH power control in full-duplex networks in accordance with one or more examples as disclosed herein.

In some examples, a power control element (e.g., the power control element 216 or other parameter) may indicate multiple power control parameter sets, pathloss reference signal parameter sets, or any combination thereof. For example, the power control element may indicate or be associated with the power control parameter set 705-*a* and the pathloss reference signal parameter set 707-*a* (both of which may be associated with HD operation) and the power control element may indicate the power control parameter set 705-*b* and the pathloss reference signal parameter set 707-*b* (both of which may be associated with HD operation). Thus, in the power control parameter set 705-*a*, the power control parameters 710-*a* may be associated with HD operation and, in the pathloss reference signal parameter set 707-*a*, pathloss reference signal parameters 715-*a* may be associated with HD operation. Similarly, in the power control parameter set 705-*b*, the power control parameters 710-*b* may be associated with FD operation and, in the pathloss reference signal parameter set 707-*b*, pathloss reference signal parameters 715-*b* may be associated with FD.

In some examples, identifiers associated with the power control parameters 710-*a* and the identifiers associated with the power control parameters 710-*b* may be the same identifiers, and the identifiers associated with the pathloss reference signal parameters 715-*a* and the pathloss reference signal parameters 715-*b* may be the same identifiers. Thus, a spatial relation information parameter may indicate one or more identifiers for the power control parameters 710-*a*, the pathloss reference signal parameters 715-*a*, the power control parameters 710-*b*, the pathloss reference signal parameters 715-*b*, or any combination thereof, and the UE may select (e.g., from among the power control parameter set 705-*a*, the pathloss reference signal parameter set 707-*a*, the power control parameter set 705-*b*, and the pathloss reference signal parameter set 707-*b*) which parameter sets are to be used for one or more slots (e.g., based on slot format configuration information). For example, if the UE is to transmit uplink communications in HD operation, the UE may select the power control parameter set 705-*a* and the pathloss reference signal parameter set 707-*a* for selecting (e.g., based on one or more identifiers included in a spatial relation information parameter) associated power control parameters 710-*a* and pathloss reference signal parameters 715-*a* that are associated with HD operation. Similarly, if the UE is to transmit uplink communications in FD operation, the UE may select the power control parameter set 705-*b* and the pathloss reference signal parameter set 707-*b* for selecting (e.g., based on one or more identifiers included in a spatial relation information parameter) associated power control parameters 710-*b* and pathloss reference signal parameters 715-*b* that are associated with FD operation.

Figure 8:
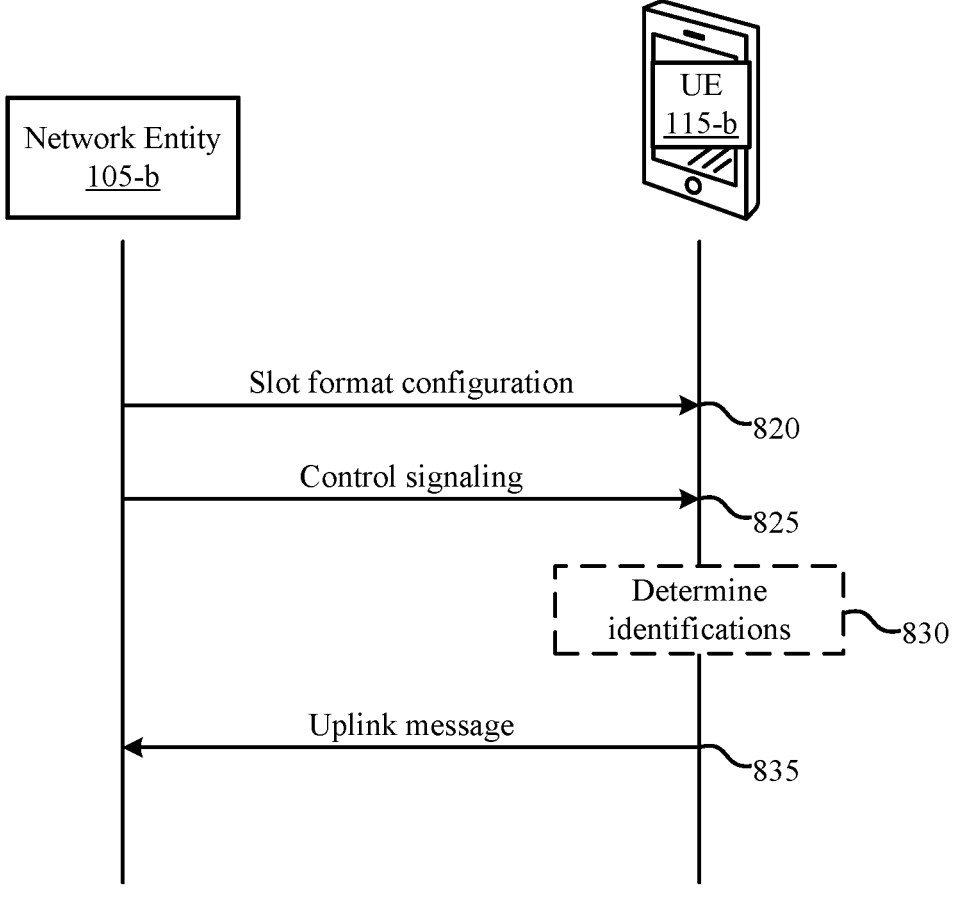
FIG. 8 shows an example of a process flow that supports considerations on PUCCH power control in full-duplex networks in accordance with one or more examples as disclosed herein.

FIG. 8 shows an example of a process flow 800 that supports considerations on PUCCH power control in full-duplex networks in accordance with one or more examples as disclosed herein.

The process flow 800 may implement various aspects of the present disclosure described herein. The elements described in the process flow 800 (e.g., UE 115-*b* and network entity 105-*b*) may be examples of similarly named elements described herein.

In the following description of the process flow 800, the operations between the various entities or elements may be performed in different orders or at different times. Some operations may also be left out of the process flow 800, or other operations may be added. Although the various entities or elements are shown performing the operations of the process flow 800, some aspects of some operations may also be performed by other entities or elements of the process flow 800 or by entities or elements that are not depicted in the process flow, or any combination thereof.

At 820, the UE 115-*b* may receive an indication of a slot format configuration for a plurality of slots and the plurality of slots includes one or more half-duplex slots and one or more full-duplex slots.

At 825, the UE 115-*b* may receive control signaling that is indicative of a first one or more parameters associated with half-duplex operation and a second one or more parameters associated with full-duplex operation and the first one or more parameters and the second one or more parameters are uplink control channel parameters that pertain to power control or spatial resource allocation. In some examples, the control signaling includes an activating medium access control (MAC) control element (CE) that includes a first identification associated with the first one or more parameters and a second identification associated with the second one or more parameters.

In some examples, the first identification is an uplink control channel spatial relationship information identification that is associated with half-duplex operation. In some examples, the second identification is an uplink control channel spatial relationship information identification that is associated with full-duplex operation. In some examples, the control signaling may include a first field that indicates that the first identification is associated with the half-duplex operation and a second field indicating the second identification is associated with the full-duplex operation.

In some examples, the control signaling includes an information element (IE) that is an uplink control channel spatial relationship information IE and the first one or more parameters and the second one or more parameters are identified in the uplink control channel spatial relationship information IE, and wherein the first one or more parameters includes a first open loop power control parameter for half-duplex operation, a first pathloss reference signal parameter for half-duplex operation, or both, and the second one or more parameters includes a second open loop power control parameter for full-duplex operation, a second pathloss reference signal parameter for full-duplex operation, or both.

In some examples, the control signaling includes an information element (IE) that is an uplink control channel spatial relationship information IE that includes a single set of parameters representative of both the first one or more parameters and the second one or more parameters, and wherein the single set of parameters includes an open loop power control parameter for both half-duplex operation and full-duplex operation, and a pathloss reference signal parameter for both half-duplex operation and full-duplex operation.

In some examples, the control signaling includes, in an uplink control channel power control information element (IE), a single set of open loop power control parameters that includes the first one or more parameters and the second one or more parameters, or a single set of pathloss reference signal parameters that includes the first one or more parameters and the second one or more parameters, or both.

In some examples, the control signaling includes, in an uplink control channel power control information element (IE), a first set of open loop power control parameters or a first set of pathloss reference signal parameters, or both, that include the first one or more parameters, and wherein the control signaling includes a second set of open loop power control parameters or a second set of pathloss reference signal parameters, or both, that include the second one or more parameters.

At 830, the UE 115-b may determine that the first identification is associated with the half-duplex operation and that the second identification is associated with the full-duplex operation based on an order of the first identification and the second identification in the control signaling.

At 835, the UE 115-b may transmit, during an uplink resource within the plurality of slots, an uplink message in accordance with the first one or more parameters or the second one or more parameters based on the slot format configuration.

Figure 9:
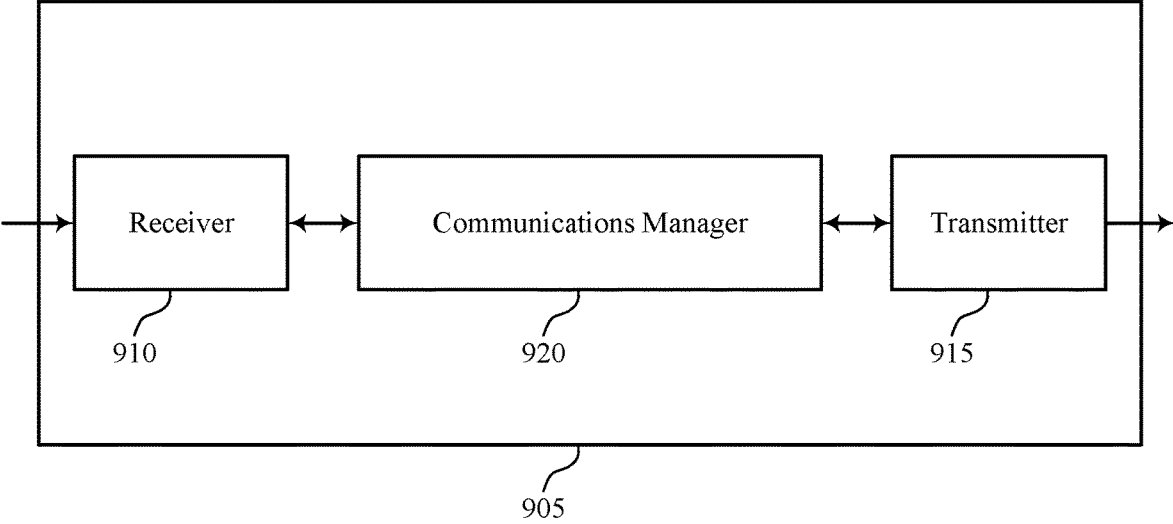
FIGS. 9 and 10 show block diagrams of devices that support considerations on PUCCH power control in full-duplex networks in accordance with one or more examples as disclosed herein.

FIG. 9 shows a block diagram 900 of a device 905 that supports considerations on PUCCH power control in full-duplex networks in accordance with one or more examples as disclosed herein. The device 905 may be an example of aspects of a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to considerations on PUCCH power control in full-duplex networks). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to considerations on PUCCH power control in full-duplex networks). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of considerations on PUCCH power control in full-duplex networks as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

Additionally, or alternatively, the communications manager 920 may support wireless communications in accordance with examples as disclosed herein. For example, the communications manager 920 is capable of, configured to, or operable to support a means for receiving an indication of a slot format configuration for a set of multiple slots, where the set of multiple slots includes one or more half-duplex slots and one or more full-duplex slots. The communications manager 920 is capable of, configured to, or operable to support a means for receiving control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation. The communications manager 920 is capable of, configured to, or operable to support a means for transmitting, during an uplink resource within the set of multiple slots, an uplink message in accordance with the first one or more parameters or the second one or more parameters based on the slot format configuration.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing, reduced power consumption, more efficient utilization of communication resources, or any combination thereof.

Figure 10:
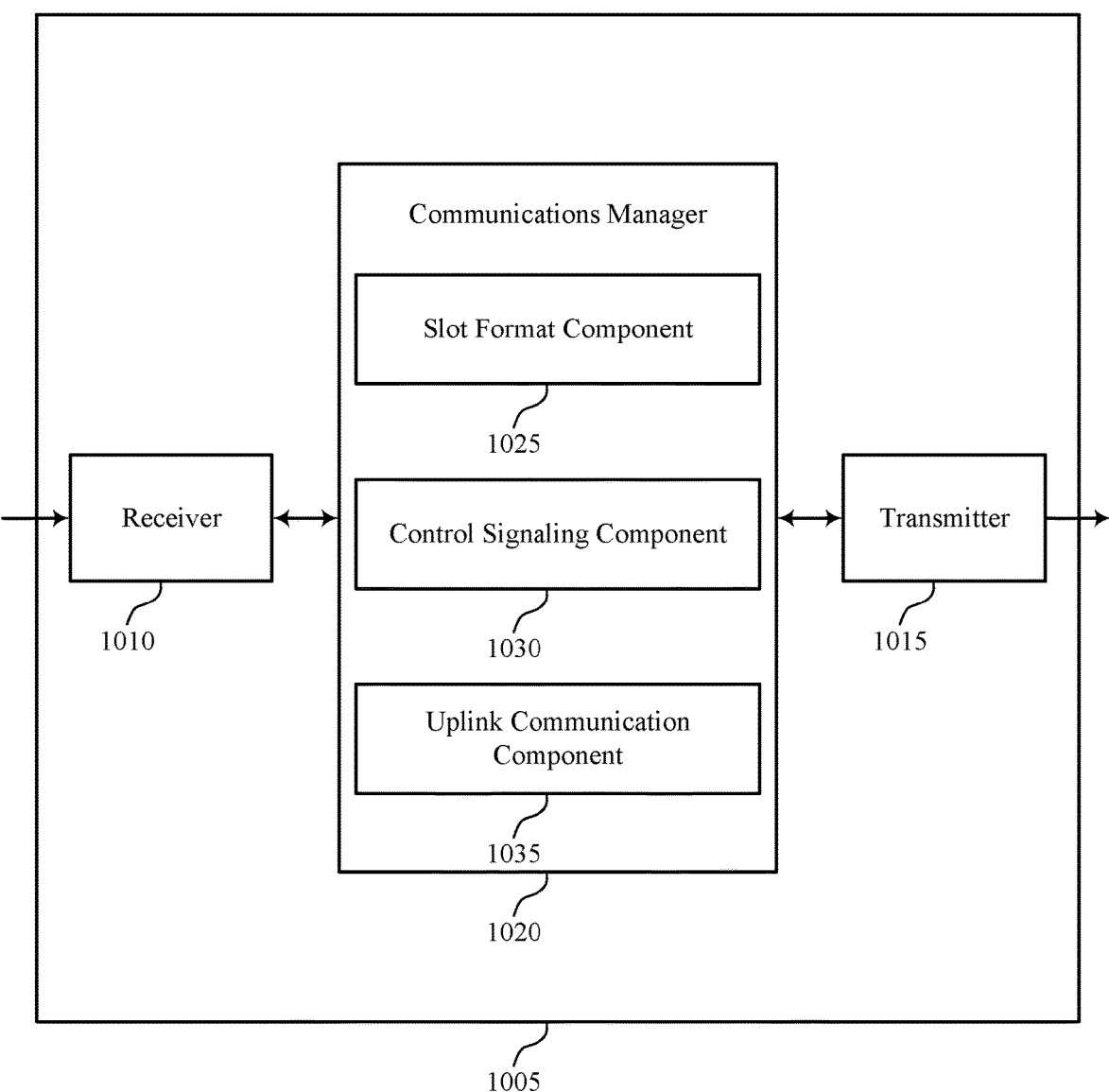

FIG. 10 shows a block diagram 1000 of a device 1005 that supports considerations on PUCCH power control in full-duplex networks in accordance with one or more examples as disclosed herein. The device 1005 may be an example of aspects of a device 905 or a UE 115 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to considerations on PUCCH power control in full-duplex networks). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to considerations on PUCCH power control in full-duplex networks). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of considerations on PUCCH power control in full-duplex networks as described herein. For example, the communications manager 1020 may include a slot format component 1025, a control signaling component 1030, an uplink communication component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The slot format component 1025 is capable of, configured to, or operable to support a means for receiving an indication of a slot format configuration for a set of multiple slots, where the set of multiple slots includes one or more half-duplex slots and one or more full-duplex slots. The control signaling component 1030 is capable of, configured to, or operable to support a means for receiving control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation. The uplink communication component 1035 is capable of, configured to, or operable to support a means for transmitting, during an uplink resource within the set of multiple slots, an uplink message in accordance with the first one or more parameters or the second one or more parameters based on the slot format configuration.

Figure 11:
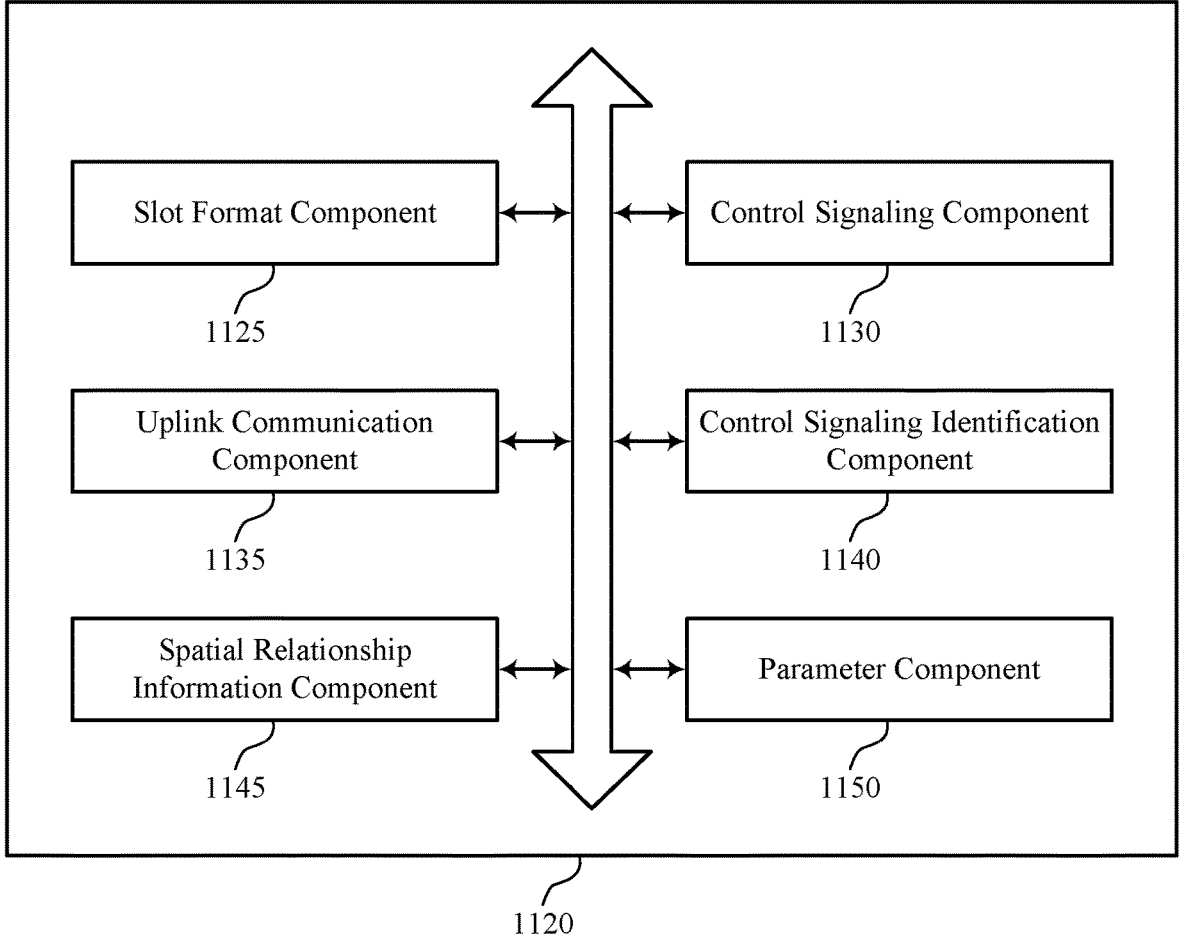
FIG. 11 shows a block diagram of a communications manager that supports considerations on PUCCH power control in full-duplex networks in accordance with one or more examples as disclosed herein.

FIG. 11 shows a block diagram 1100 of a communications manager 1120 that supports considerations on PUCCH power control in full-duplex networks in accordance with one or more examples as disclosed herein. The communications manager 1120 may be an example of aspects of a communications manager 920, a communications manager 1020, or both, as described herein. The communications manager 1120, or various components thereof, may be an example of means for performing various aspects of considerations on PUCCH power control in full-duplex networks as described herein. For example, the communications manager 1120 may include a slot format component 1125, a control signaling component 1130, an uplink communication component 1135, a control signaling identification component 1140, a spatial relationship information component 1145, a parameter component 1150, or any combination thereof. Each of these components, or components or subcomponents thereof (e.g., one or more processors, one or more memories), may communicate, directly or indirectly, with one another (e.g., via one or more buses).

Additionally, or alternatively, the communications manager 1120 may support wireless communications in accordance with examples as disclosed herein. The slot format component 1125 is capable of, configured to, or operable to support a means for receiving an indication of a slot format configuration for a set of multiple slots, where the set of multiple slots includes one or more half-duplex slots and one or more full-duplex slots. The control signaling component 1130 is capable of, configured to, or operable to support a means for receiving control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation. The uplink communication component 1135 is capable of, configured to, or operable to support a means for transmitting, during an uplink resource within the set of multiple slots, an uplink message in accordance with the first one or more parameters or the second one or more parameters based on the slot format configuration.

In some examples, the control signaling includes an activating medium access control (MAC) control element (CE) that includes a first identification associated with the first one or more parameters and a second identification associated with the second one or more parameters. In some examples, the first identification is an uplink control channel spatial relationship information identification that is associated with half-duplex operation. In some examples, the second identification is an uplink control channel spatial relationship information identification that is associated with full-duplex operation.

In some examples, the control signaling includes a first field that indicates that the first identification is associated with the half-duplex operation and a second field indicating the second identification is associated with the full-duplex operation.

In some examples, the control signaling identification component 1140 is capable of, configured to, or operable to support a means for determining that the first identification is associated with the half-duplex operation and that the second identification is associated with the full-duplex operation based on an order of the first identification and the second identification in the control signaling.

In some examples, the control signaling includes an information element (IE) that is an uplink control channel spatial relationship information IE, where the first one or more parameters and the second one or more parameters are identified in the uplink control channel spatial relationship information IE, and where the first one or more parameters includes a first open loop power control parameter for half-duplex operation, a first pathloss reference signal parameter for half-duplex operation, or both, and the second one or more parameters includes a second open loop power control parameter for full-duplex operation, a second pathloss reference signal parameter for full-duplex operation, or both.

In some examples, the control signaling includes an information element (IE) that is an uplink control channel spatial relationship information IE that includes a single set of parameters representative of both the first one or more parameters and the second one or more parameters, and where the single set of parameters includes an open loop power control parameter for both half-duplex operation and full-duplex operation, and a pathloss reference signal parameter for both half-duplex operation and full-duplex operation.

In some examples, the control signaling includes, in an uplink control channel power control information element (IE), a single set of open loop power control parameters that includes the first one or more parameters and the second one or more parameters, or a single set of pathloss reference signal parameters that includes the first one or more parameters and the second one or more parameters, or both.

In some examples, the control signaling includes, in an uplink control channel power control information element (IE), a first set of open loop power control parameters or a first set of pathloss reference signal parameters, or both, that include the first one or more parameters, and where the control signaling includes a second set of open loop power control parameters or a second set of pathloss reference signal parameters, or both, that include the second one or more parameters.

Figure 12:
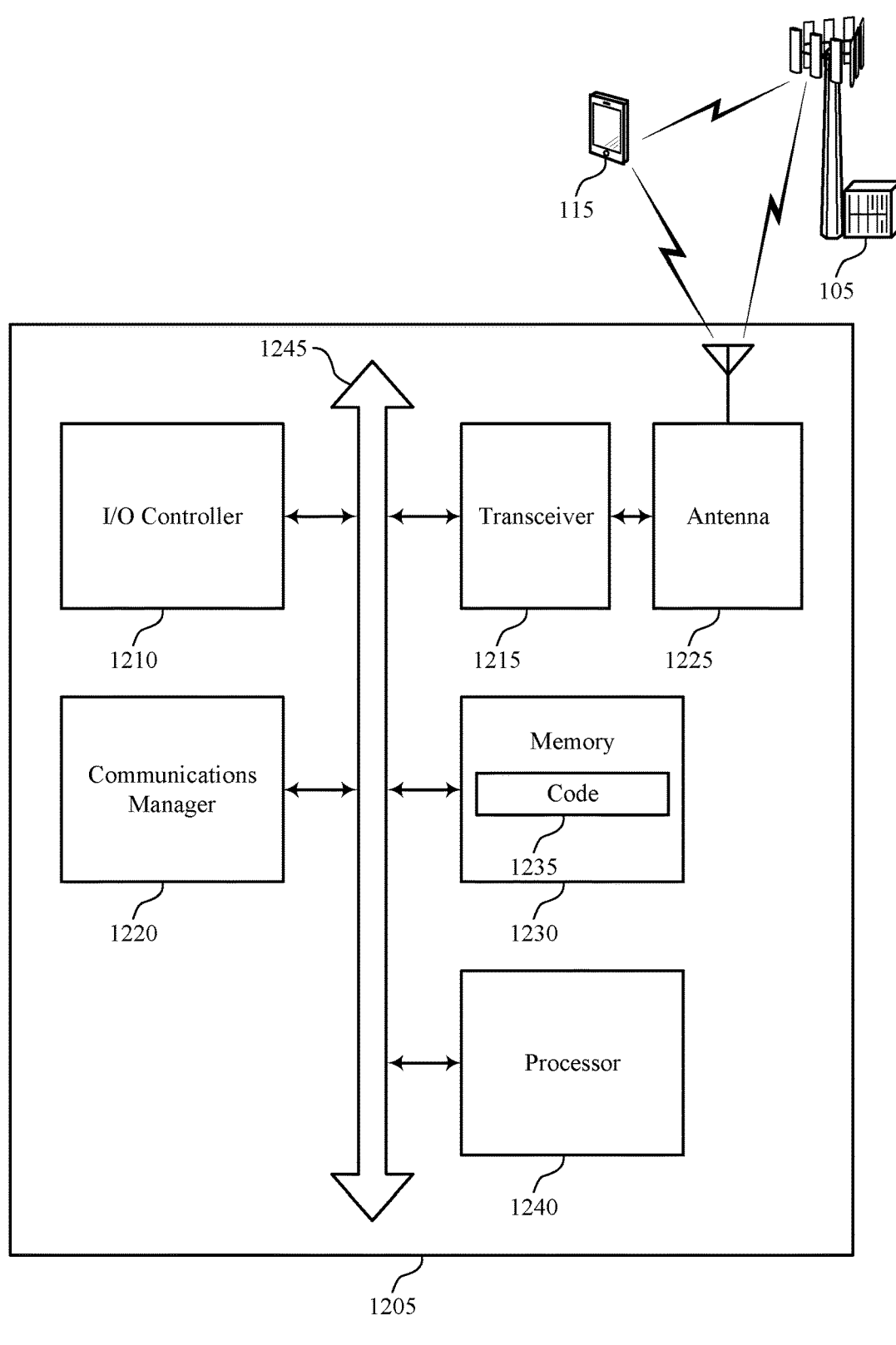
FIG. 12 shows a diagram of a system including a device that supports considerations on PUCCH power control in full-duplex networks in accordance with one or more examples as disclosed herein.

FIG. 12 shows a diagram of a system 1200 including a device 1205 that supports considerations on PUCCH power control in full-duplex networks in accordance with one or more examples as disclosed herein. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, at least one memory 1230, code 1235, and at least one processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of one or more processors, such as the at least one processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The at least one memory 1230 may include random access memory (RAM) and read-only memory (ROM). The at least one memory 1230 may store computer-readable, computer-executable code 1235 including instructions that, when executed by the at least one processor 1240, cause the device 1205 to perform various functions described herein. The code 1235 may be stored in a non-transitory computer-readable medium such as system memory or another type of memory. In some cases, the code 1235 may not be directly executable by the at least one processor 1240 but may cause a computer (e.g., when compiled and executed) to perform functions described herein. In some cases, the at least one memory 1230 may contain, among other things, a basic I/O system (BIOS) which may control basic hardware or software operation such as the interaction with peripheral components or devices.

The at least one processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1240 may be configured to operate a memory array using a memory controller. In some other cases, a memory controller may be integrated into the at least one processor 1240. The at least one processor 1240 may be configured to execute computer-readable instructions stored in a memory (e.g., the at least one memory 1230) to cause the device 1205 to perform various functions (e.g., functions or tasks supporting considerations on PUCCH power control in full-duplex networks). For example, the device 1205 or a component of the device 1205 may include at least one processor 1240 and at least one memory 1230 coupled with or to the at least one processor 1240, the at least one processor 1240 and at least one memory 1230 configured to perform various functions described herein. In some examples, the at least one processor 1240 may include multiple processors and the at least one memory 1230 may include multiple memories. One or more of the multiple processors may be coupled with one or more of the multiple memories, which may, individually or collectively, be configured to perform various functions herein. In some examples, the at least one processor 1240 may be a component of a processing system, which may refer to a system (such as a series) of machines, circuitry (including, for example, one or both of processor circuitry (which may include the at least one processor 1240) and memory circuitry (which may include the at least one memory 1230)), or components, that receives or obtains inputs and processes the inputs to produce, generate, or obtain a set of outputs. The processing system may be configured to perform one or more of the functions described herein. As such, the at least one processor 1240 or a processing system including the at least one processor 1240 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1230 or otherwise, to perform one or more of the functions described herein.

Additionally, or alternatively, the communications manager 1220 may support wireless communications in accordance with examples as disclosed herein. For example, the communications manager 1220 is capable of, configured to, or operable to support a means for receiving an indication of a slot format configuration for a set of multiple slots, where the set of multiple slots includes one or more half-duplex slots and one or more full-duplex slots. The communications manager 1220 is capable of, configured to, or operable to support a means for receiving control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation. The communications manager 1220 is capable of, configured to, or operable to support a means for transmitting, during an uplink resource within the set of multiple slots, an uplink message in accordance with the first one or more parameters or the second one or more parameters based on the slot format configuration.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the at least one processor 1240, the at least one memory 1230, the code 1235, or any combination thereof. For example, the code 1235 may include instructions executable by the at least one processor 1240 to cause the device 1205 to perform various aspects of considerations on PUCCH power control in full-duplex networks as described herein, or the at least one processor 1240 and the at least one memory 1230 may be otherwise configured to, individually or collectively, perform or support such operations.

Figure 13:
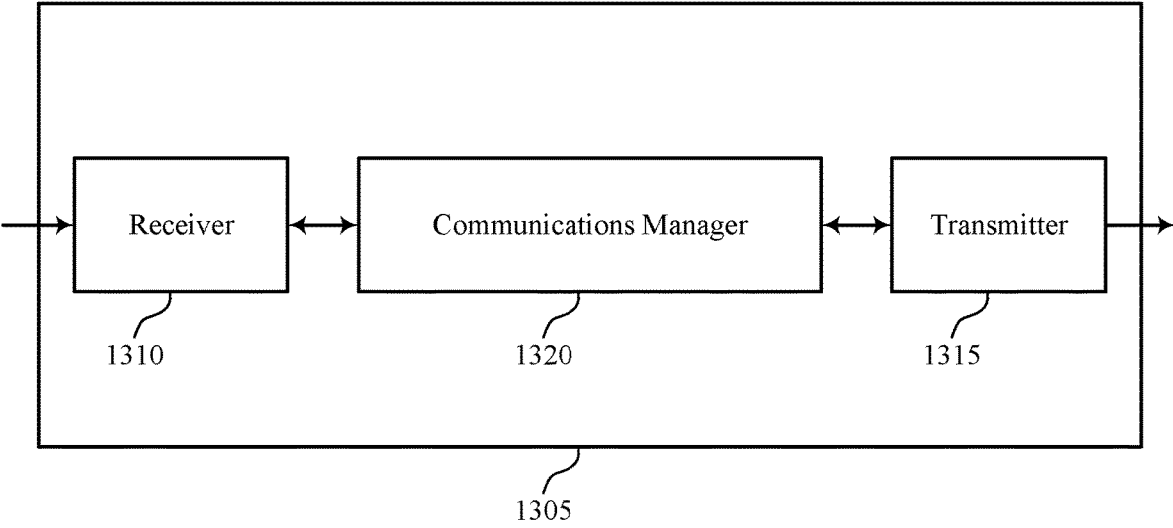
FIGS. 13 and 14 show block diagrams of devices that support considerations on PUCCH power control in full-duplex networks in accordance with one or more examples as disclosed herein.

FIG. 13 shows a block diagram 1300 of a device 1305 that supports considerations on PUCCH power control in full-duplex networks in accordance with one or more examples as disclosed herein. The device 1305 may be an example of aspects of a network entity 105 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to, individually or collectively, support or enable the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of considerations on PUCCH power control in full-duplex networks as described herein. For example, the communications manager 1320, the receiver 1310, the transmitter 1315, or various combinations or components thereof may be capable of performing one or more of the functions described herein.

In some examples, the communications manager 1320, the receiver 1310, the transmitter 1315, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1320, the receiver 1310, the transmitter 1315, or various combinations or components thereof may be implemented in code (e.g., as communications management software or firmware) executed by at least one processor. If implemented in code executed by at least one processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

Additionally, or alternatively, the communications manager 1320 may support wireless communications in accordance with examples as disclosed herein. For example, the communications manager 1320 is capable of, configured to, or operable to support a means for transmitting an indication of a slot format configuration for a set of multiple slots, where the set of multiple slots includes one or more half-duplex slots and one or more full-duplex slots. The communications manager 1320 is capable of, configured to, or operable to support a means for transmitting control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation. The communications manager 1320 is capable of, configured to, or operable to support a means for receiving, during an uplink resource within the set of multiple slots, an uplink message in accordance with the first one or more parameters or the second one or more parameters based on the slot format configuration.

By including or configuring the communications manager 1320 in accordance with examples as described herein, the device 1305 (e.g., at least one processor controlling or otherwise coupled with the receiver 1310, the transmitter 1315, the communications manager 1320, or a combination thereof) may support techniques for reduced processing, reduced power consumption, more efficient utilization of communication resources, or any combination thereof.

Figure 14:

FIG. 14 shows a block diagram 1400 of a device 1405 that supports considerations on PUCCH power control in full-duplex networks in accordance with one or more examples as disclosed herein. The device 1405 may be an example of aspects of a device 1305 or a network entity 105 as described herein. The device 1405 may include a receiver 1410, a transmitter 1415, and a communications manager 1420. The device 1405, or one or more components of the device 1405 (e.g., the receiver 1410, the transmitter 1415, and the communications manager 1420), may include at least one processor, which may be coupled with at least one memory, to support the described techniques. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of considerations on PUCCH power control in full-duplex networks as described herein. For example, the communications manager 1420 may include a slot format component 1425, a control signaling component 1430, an uplink communication component 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications in accordance with examples as disclosed herein. The slot format component 1425 is capable of, configured to, or operable to support a means for transmitting an indication of a slot format configuration for a set of multiple slots, where the set of multiple slots includes one or more half-duplex slots and one or more full-duplex slots. The control signaling component 1430 is capable of, configured to, or operable to support a means for transmitting control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation. The uplink communication component 1435 is capable of, configured to, or operable to support a means for receiving, during an uplink resource within the set of multiple slots, an uplink message in accordance with the first one or more parameters or the second one or more parameters based on the slot format configuration.

Figure 15:
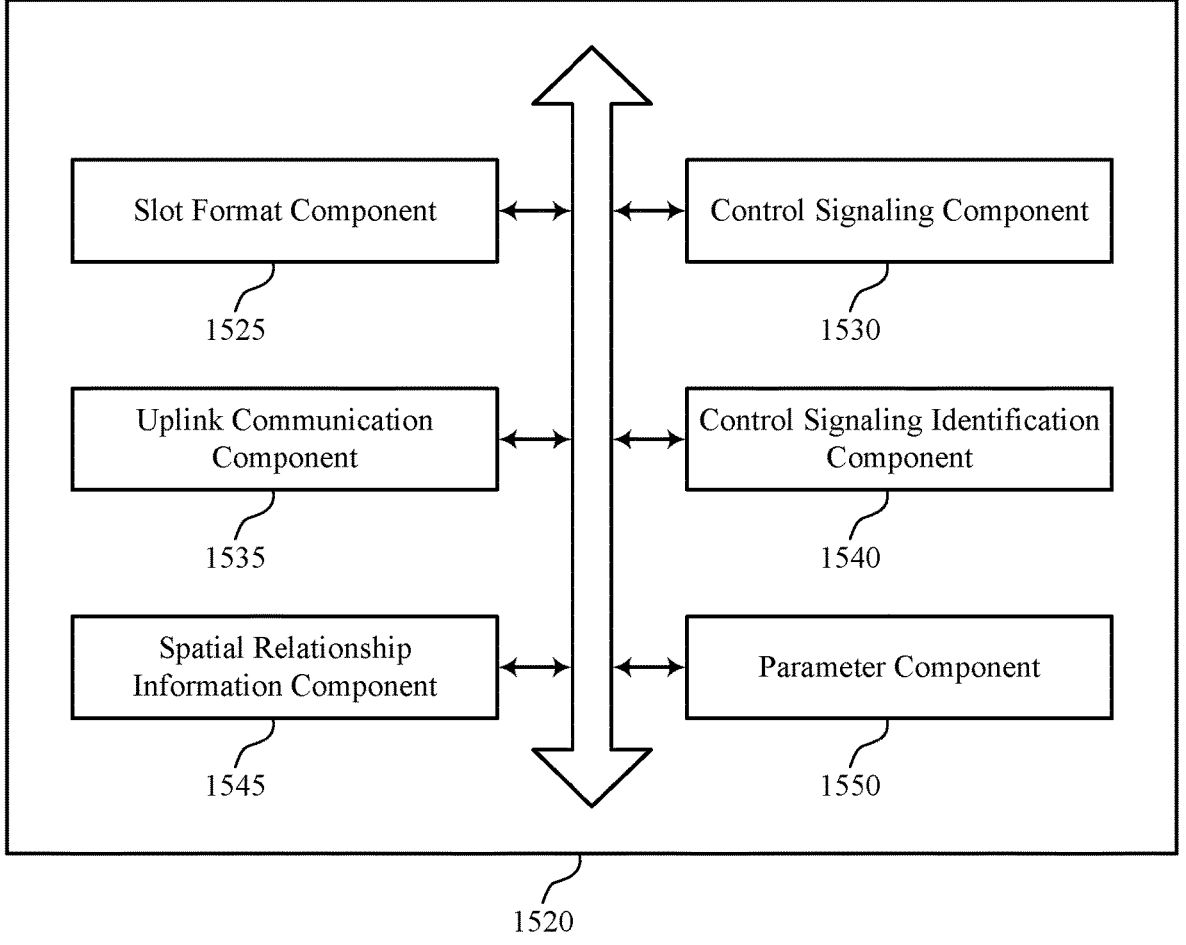
FIG. 15 shows a block diagram of a communications manager that supports considerations on PUCCH power control in full-duplex networks in accordance with one or more examples as disclosed herein.

FIG. 15 shows a block diagram 1500 of a communications manager 1520 that supports considerations on PUCCH power control in full-duplex networks in accordance with one or more examples as disclosed herein. The communications manager 1520 may be an example of aspects of a communications manager 1320, a communications manager

1420, or both, as described herein. The communications manager 1520, or various components thereof, may be an example of means for performing various aspects of considerations on PUCCH power control in full-duplex networks as described herein. For example, the communications manager 1520 may include a slot format component 1525, a control signaling component 1530, an uplink communication component 1535, a control signaling identification component 1540, a spatial relationship information component 1545, a parameter component 1550, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1520 may support wireless communications in accordance with examples as disclosed herein. The slot format component 1525 is capable of, configured to, or operable to support a means for transmitting an indication of a slot format configuration for a set of multiple slots, where the set of multiple slots includes one or more half-duplex slots and one or more full-duplex slots. The control signaling component 1530 is capable of, configured to, or operable to support a means for transmitting control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation. The uplink communication component 1535 is capable of, configured to, or operable to support a means for receiving, during an uplink resource within the set of multiple slots, an uplink message in accordance with the first one or more parameters or the second one or more parameters based on the slot format configuration.

In some examples, the control signaling includes an activating medium access control (MAC) control element (CE) that includes a first identification associated with the first one or more parameters and a second identification associated with the second one or more parameters. In some examples, the first identification is an uplink control channel spatial relationship information identification that is associated with half-duplex operation. In some examples, the second identification is an uplink control channel spatial relationship information identification that is associated with full-duplex operation.

In some examples, the control signaling includes a first field that indicates that the first identification is associated with the half-duplex operation and a second field indicating the second identification is associated with the full-duplex operation.

In some examples, the control signaling includes an information element (IE) that is an uplink control channel spatial relationship information IE, where the first one or more parameters and the second one or more parameters are identified in the uplink control channel spatial relationship information IE, and where the first one or more parameters includes a first open loop power control parameter for half-duplex operation, a first pathloss reference signal parameter for half-duplex operation, or both, and the second one or more parameters includes a second open loop power control parameter for full-duplex operation, a second pathloss reference signal parameter for full-duplex operation, or both.

In some examples, the control signaling includes an information element (IE) that is an uplink control channel spatial relationship information IE that includes a single set of parameters representative of both the first one or more parameters and the second one or more parameters, and where the single set of parameters includes an open loop power control parameter for both half-duplex operation and full-duplex operation, and a pathloss reference signal parameter for both half-duplex operation and full-duplex operation.

In some examples, the control signaling includes, in an uplink control channel power control information element (IE), a single set of open loop power control parameters that includes the first one or more parameters and the second one or more parameters, or a single set of pathloss reference signal parameters that includes the first one or more parameters and the second one or more parameters, or both.

In some examples, the control signaling includes, in an uplink control channel power control information element (IE), a first set of open loop power control parameters or a first set of pathloss reference signal parameters, or both, that include the first one or more parameters, and where the control signaling includes a second set of open loop power control parameters or a second set of pathloss reference signal parameters, or both, that include the second one or more parameters.

Figure 16:
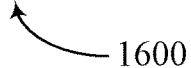
FIG. 16 shows a diagram of a system including a device that supports considerations on PUCCH power control in full-duplex networks in accordance with one or more examples as disclosed herein.

FIG. 16 shows a diagram of a system 1600 including a device 1605 that supports considerations on PUCCH power control in full-duplex networks in accordance with one or more examples as disclosed herein. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, at least one memory 1625, code 1630, and at least one processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or one or more memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or one or more memory components (e.g., the at least one processor 1635, the at least one memory 1625, or both), may be included in a chip or chip assembly that is installed in the device 1605. In some examples, the transceiver 1610 may be operable to support communications via one or more communications links (e.g., a communication link 125, a backhaul communication link 120, a midhaul communication link 162, a fronthaul communication link 168).

The at least one memory 1625 may include RAM, ROM, or any combination thereof. The at least one memory 1625 may store computer-readable, computer-executable code 1630 including instructions that, when executed by one or more of the at least one processor 1635, cause the device 1605 to perform various functions described herein. The code 1630 may be stored in a non-transitory computer-readable medium such as system memory or another type of memory. In some cases, the code 1630 may not be directly executable by a processor of the at least one processor 1635 but may cause a computer (e.g., when compiled and executed) to perform functions described herein. In some cases, the at least one memory 1625 may contain, among other things, a BIOS which may control basic hardware or software operation such as the interaction with peripheral components or devices. In some examples, the at least one processor 1635 may include multiple processors and the at least one memory 1625 may include multiple memories. One or more of the multiple processors may be coupled with one or more of the multiple memories which may, individually or collectively, be configured to perform various functions herein (for example, as part of a processing system).

The at least one processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1635 may be configured to operate a memory array using a memory controller. In some other cases, a memory controller may be integrated into one or more of the at least one processor 1635. The at least one processor 1635 may be configured to execute computer-readable instructions stored in a memory (e.g., one or more of the at least one memory 1625) to cause the device 1605 to perform various functions (e.g., functions or tasks supporting considerations on PUCCH power control in full-duplex networks). For example, the device 1605 or a component of the device 1605 may include at least one processor 1635 and at least one memory 1625 coupled with one or more of the at least one processor 1635, the at least one processor 1635 and the at least one memory 1625 configured to perform various functions described herein.

The at least one processor 1635 may be an example of a cloud-computing platform (e.g., one or more physical nodes and supporting software such as operating systems, virtual machines, or container instances) that may host the functions (e.g., by executing code 1630) to perform the functions of the device 1605. The at least one processor 1635 may be any one or more suitable processors capable of executing scripts or instructions of one or more software programs stored in the device 1605 (such as within one or more of the at least one memory 1625). In some examples, the at least one processor 1635 may include multiple processors and the at least one memory 1625 may include multiple memories. One or more of the multiple processors may be coupled with one or more of the multiple memories, which may, individually or collectively, be configured to perform various functions herein. In some examples, the at least one processor 1635 may be a component of a processing system, which may refer to a system (such as a series) of machines, circuitry (including, for example, one or both of processor circuitry (which may include the at least one processor 1635) and memory circuitry (which may include the at least one memory 1625)), or components, that receives or obtains inputs and processes the inputs to produce, generate, or obtain a set of outputs. The processing system may be configured to perform one or more of the functions described herein. As such, the at least one processor 1635 or a processing system including the at least one processor 1635 may be configured to, configurable to, or operable to cause the device 1605 to perform one or more of the functions described herein. Further, as described herein, being "configured to," being "configurable to," and being "operable to" may be used interchangeably and may be associated with a capability, when executing code stored in the at least one memory 1625 or otherwise, to perform one or more of the functions described herein.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the at least one memory 1625, the code 1630, and the at least one processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

Additionally, or alternatively, the communications manager 1620 may support wireless communications in accordance with examples as disclosed herein. For example, the communications manager 1620 is capable of, configured to, or operable to support a means for transmitting an indication of a slot format configuration for a set of multiple slots, where the set of multiple slots includes one or more half-duplex slots and one or more full-duplex slots. The communications manager 1620 is capable of, configured to, or operable to support a means for transmitting control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation. The communications manager 1620 is capable of, configured to, or operable to support a means for receiving, during an uplink resource within the set of multiple slots, an uplink message in accordance with the first one or more parameters or the second one or more parameters based on the slot format configuration.

By including or configuring the communications manager 1620 in accordance with examples as described herein, the device 1605 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, one or more of the at least one processor 1635, one or more of the at least one memory 1625, the code 1630, or any combination thereof (for example, by a processing system including at least a portion of the at least one processor 1635, the at least one memory 1625, the code 1630, or any combination thereof). For example, the code 1630 may include instructions executable by one or more of the at least one processor 1635 to cause the device 1605 to perform various aspects of considerations on PUCCH power control in full-duplex networks as described herein, or the at least one processor 1635 and the at least one memory 1625 may be otherwise configured to, individually or collectively, perform or support such operations.

FIG. 17 shows a flowchart illustrating a method 1700 that supports considerations on PUCCH power control in full-duplex networks in accordance with examples as disclosed herein. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving an indication of a slot format configuration for a set of multiple slots, where the set of multiple slots includes one or more half-duplex slots and one or more full-duplex slots. The operations of block 1705 may be performed in accordance with examples as disclosed herein. In some examples, aspects of the operations of 1705 may be performed by a slot format component 1125 as described with reference to FIG. 11.

At 1710, the method may include receiving control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation. The operations of block 1710 may be performed in accordance with examples as disclosed herein. In some examples, aspects of the operations of 1710 may be performed by a control signaling component 1130 as described with reference to FIG. 11.

At 1715, the method may include transmitting, during an uplink resource within the set of multiple slots, an uplink message in accordance with the first one or more parameters or the second one or more parameters based on the slot format configuration. The operations of block 1715 may be performed in accordance with examples as disclosed herein. In some examples, aspects of the operations of 1715 may be performed by an uplink communication component 1135 as described with reference to FIG. 11.

FIG. 18 shows a flowchart illustrating a method 1800 that supports considerations on PUCCH power control in full-duplex networks in accordance with examples as disclosed herein. The operations of the method 1800 may be implemented by a network entity or its components as described herein. For example, the operations of the method 1800 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1805, the method may include transmitting an indication of a slot format configuration for a set of multiple slots, where the set of multiple slots includes one or more half-duplex slots and one or more full-duplex slots. The operations of block 1805 may be performed in accordance with examples as disclosed herein. In some examples, aspects of the operations of 1805 may be performed by a slot format component 1525 as described with reference to FIG. 15.

At 1810, the method may include transmitting control signaling that is indicative of a first one or more parameters associated with half-duplex operation and a second one or more parameters associated with full-duplex operation, where the first one or more parameters and the second one or more parameters are uplink control channel parameters that pertain to power control or spatial resource allocation. The operations of block 1810 may be performed in accordance with examples as disclosed herein. In some examples, aspects of the operations of 1810 may be performed by a control signaling component 1530 as described with reference to FIG. 15.

At 1815, the method may include receiving, during an uplink resource within the set of multiple slots, an uplink message in accordance with the first one or more parameters or the second one or more parameters based on the slot format configuration. The operations of block 1815 may be performed in accordance with examples as disclosed herein. In some examples, aspects of the operations of 1815 may be performed by an uplink communication component 1535 as described with reference to FIG. 15.

The following provides an overview of aspects of the present disclosure:

Aspect 1: A method for wireless communications at a UE, comprising: receiving an indication of a slot format configuration for a plurality of slots, wherein the plurality of slots includes one or more half-duplex slots and one or more full-duplex slots; receiving control signaling that is indicative of a first one or more parameters associated with half-duplex operation and a second one or more parameters associated with full-duplex operation, wherein the first one or more parameters and the second one or more parameters are uplink control channel parameters that pertain to power control or spatial resource allocation; and transmitting, during an uplink resource within the plurality of slots, an uplink message in accordance with the first one or more parameters or the second one or more parameters based on the slot format configuration.

Aspect 2: The method of aspect 1, wherein the control signaling includes an activating medium access control (MAC) control element (CE) that includes a first identification associated with the first one or more parameters and a second identification associated with the second one or more parameters; the first identification is an uplink control channel spatial relationship information identification that is associated with half-duplex operation; and the second identification is an uplink control channel spatial relationship information identification that is associated with full-duplex operation.

Aspect 3: The method of aspect 2, wherein the control signaling comprises a first field that indicates that the first identification is associated with the half-duplex operation and a second field indicating the second identification is associated with the full-duplex operation.

Aspect 4: The method of any of aspects 2 through 3, further comprising: determining that the first identification is associated with the half-duplex operation and that the second identification is associated with the full-duplex operation based at least in part on an order of the first identification and the second identification in the control signaling.

Aspect 5: The method of any of aspects 1 through 4, wherein the control signaling includes an information element (IE) that is an uplink control channel spatial relationship information IE, wherein the first one or more parameters and the second one or more parameters are identified in the uplink control channel spatial relationship information IE, and wherein the first one or more parameters includes a first open loop power control parameter for half-duplex operation, a first pathloss reference signal parameter for half-duplex operation, or both, and the second one or more parameters includes a second open loop power control parameter for full-duplex operation, a second pathloss reference signal parameter for full-duplex operation, or both.

Aspect 6: The method of any of aspects 1 through 5, wherein the control signaling includes an information element (IE) that is an uplink control channel spatial relationship information IE that includes a single set of parameters representative of both the first one or more parameters and the second one or more parameters, and wherein the single set of parameters includes an open loop power control parameter for both half-duplex operation and full-duplex operation, and a pathloss reference signal parameter for both half-duplex operation and full-duplex operation.

Aspect 7: The method of any of aspects 1 through 6, wherein the control signaling includes, in an uplink control channel power control information element (IE), a single set of open loop power control parameters that includes the first one or more parameters and the second one or more parameters, or a single set of pathloss reference signal parameters that includes the first one or more parameters and the second one or more parameters, or both.

Aspect 8: The method of any of aspects 1 through 7, wherein the control signaling includes, in an uplink control channel power control information element (IE), a first set of open loop power control parameters or a first set of pathloss reference signal parameters, or both, that include the first one or more parameters, and wherein the control signaling includes a second set of open loop power control parameters or a second set of pathloss reference signal parameters, or both, that include the second one or more parameters.

Aspect 9: A method for wireless communications at a network entity, comprising: transmitting an indication of a slot format configuration for a plurality of slots, wherein the plurality of slots includes one or more half-duplex slots and one or more full-duplex slots; transmitting control signaling that is indicative of a first one or more parameters associated with half-duplex operation and a second one or more parameters associated with full-duplex operation, wherein the first one or more parameters and the second one or more parameters are uplink control channel parameters that pertain to power control or spatial resource allocation; and receiving, during an uplink resource within the plurality of slots, an uplink message in accordance with the first one or more parameters or the second one or more parameters based on the slot format configuration.

Aspect 10: The method of aspect 9, wherein the control signaling includes an activating medium access control (MAC) control element (CE) that includes a first identification associated with the first one or more parameters and a second identification associated with the second one or more parameters; the first identification is an uplink control channel spatial relationship information identification that is associated with half-duplex operation; and the second identification is an uplink control channel spatial relationship information identification that is associated with full-duplex operation.

Aspect 11: The method of aspect 10, wherein the control signaling comprises a first field that indicates that the first identification is associated with the half-duplex operation and a second field indicating the second identification is associated with the full-duplex operation.

Aspect 12: The method of any of aspects 9 through 11, wherein the control signaling includes an information element (IE) that is an uplink control channel spatial relationship information IE, wherein the first one or more parameters and the second one or more parameters are identified in the uplink control channel spatial relationship information IE, and wherein the first one or more parameters includes a first open loop power control parameter for half-duplex operation, a first pathloss reference signal parameter for half-duplex operation, or both, and the second one or more parameters includes a second open loop power control parameter for full-duplex operation, a second pathloss reference signal parameter for full-duplex operation, or both.

Aspect 13: The method of any of aspects 9 through 12, wherein the control signaling includes an information element (IE) that is an uplink control channel spatial relationship information IE that includes a single set of parameters representative of both the first one or more parameters and the second one or more parameters, and wherein the single set of parameters includes an open loop power control parameter for both half-duplex operation and full-duplex operation, and a pathloss reference signal parameter for both half-duplex operation and full-duplex operation.

Aspect 14: The method of any of aspects 9 through 13, wherein the control signaling includes, in an uplink control channel power control information element (IE), a single set of open loop power control parameters that includes the first one or more parameters and the second one or more parameters, or a single set of pathloss reference signal parameters that includes the first one or more parameters and the second one or more parameters, or both.

Aspect 15: The method of any of aspects 9 through 14, wherein the control signaling includes, in an uplink control channel power control information element (IE), a first set of open loop power control parameters or a first set of pathloss reference signal parameters, or both, that include the first one or more parameters, and wherein the control signaling includes a second set of open loop power control parameters or a second set of pathloss reference signal parameters, or both, that include the second one or more parameters.

Aspect 16: A UE for wireless communications, comprising one or more memories storing processor-executable code, and one or more processors coupled with the one or more memories and individually or collectively operable to execute the code to cause the UE to perform a method of any of aspects 1 through 8.

Aspect 17: A UE for wireless communications, comprising at least one means for performing a method of any of aspects 1 through 8.

Aspect 18: A non-transitory computer-readable medium storing code for wireless communications, the code comprising instructions executable by a processor to perform a method of any of aspects 1 through 8.

Aspect 19: A network entity for wireless communications, comprising one or more memories storing processor-executable code, and one or more processors coupled with the one or more memories and individually or collectively operable to execute the code to cause the network entity to perform a method of any of aspects 9 through 15.

Aspect 20: A network entity for wireless communications, comprising at least one means for performing a method of any of aspects 9 through 15.

Aspect 21: A non-transitory computer-readable medium storing code for wireless communications, the code comprising instructions executable by a processor to perform a method of any of aspects 9 through 15. It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive an indication of a slot format configuration for a plurality of slots, wherein the plurality of slots includes one or more half-duplex slots and one or more full-duplex slots;

receive control signaling that is indicative of a first one or more parameters associated with half-duplex operation and a second one or more parameters associated with full-duplex operation, wherein the first one or more parameters and the second one or more parameters are uplink control channel parameters that pertain to power control or spatial resource allocation; and transmit, during an uplink resource within the plurality of slots, an uplink message in accordance with the first one or more parameters or the second one or more parameters based on the slot format configuration.

2. The UE of claim 1, wherein:

the control signaling includes an activating medium access control (MAC) control element (CE) that includes a first identification associated with the first one or more parameters and a second identification associated with the second one or more parameters;

the first identification is an uplink control channel spatial relationship information identification that is associated with half-duplex operation; and the second identification is an uplink control channel spatial relationship information identification that is associated with full-duplex operation.

3. The UE of claim 2, wherein the control signaling comprises a first field that indicates that the first identification is associated with the half-duplex operation and a second field indicating the second identification is associated with the full-duplex operation.

4. The UE of claim 2, wherein the one or more processors are individually or collectively further operable to execute the code to cause the UE to:

determine that the first identification is associated with the half-duplex operation and that the second identification is associated with the full-duplex operation based at least in part on an order of the first identification and the second identification in the control signaling.

5. The UE of claim 1, wherein the control signaling includes an information element (IE) that is an uplink control channel spatial relationship information IE, wherein the first one or more parameters and the second one or more parameters are identified in the uplink control channel spatial relationship information IE, and wherein the first one or more parameters includes a first open loop power control parameter for half-duplex operation, a first pathloss reference signal parameter for half-duplex operation, or both, and the second one or more parameters includes a second open loop power control parameter for full-duplex operation, a second pathloss reference signal parameter for full-duplex operation, or both.

6. The UE of claim 1, wherein the control signaling includes an information element (IE) that is an uplink control channel spatial relationship information IE that includes a single set of parameters representative of both the first one or more parameters and the second one or more parameters, and wherein the single set of parameters includes an open loop power control parameter for both half-duplex operation and full-duplex operation, and a pathloss reference signal parameter for both half-duplex operation and full-duplex operation.

7. The UE of claim 1, wherein the control signaling includes, in an uplink control channel power control information element (IE), a single set of open loop power control parameters that includes the first one or more parameters and the second one or more parameters, or a single set of pathloss reference signal parameters that includes the first one or more parameters and the second one or more parameters, or both.

8. The UE of claim 1, wherein the control signaling includes, in an uplink control channel power control information element (IE), a first set of open loop power control parameters or a first set of pathloss reference signal parameters, or both, that include the first one or more parameters, and wherein the control signaling includes a second set of open loop power control parameters or a second set of pathloss reference signal parameters, or both, that include the second one or more parameters.

9. A method for wireless communications at a user equipment (UE), comprising:

receiving an indication of a slot format configuration for a plurality of slots, wherein the plurality of slots includes one or more half-duplex slots and one or more full-duplex slots;

receiving control signaling that is indicative of a first one or more parameters associated with half-duplex operation and a second one or more parameters associated with full-duplex operation, wherein the first one or more parameters and the second one or more parameters are uplink control channel parameters that pertain to power control or spatial resource allocation; and transmitting, during an uplink resource within the plurality of slots, an uplink message in accordance with the first one or more parameters or the second one or more parameters based on the slot format configuration.

10. The method of claim 9, wherein:

the control signaling includes an activating medium access control (MAC) control element (CE) that includes a first identification associated with the first one or more parameters and a second identification associated with the second one or more parameters;

the first identification is an uplink control channel spatial relationship information identification that is associated with half-duplex operation; and the second identification is an uplink control channel spatial relationship information identification that is associated with full-duplex operation.

11. The method of claim 10, wherein the control signaling comprises a first field that indicates that the first identification is associated with the half-duplex operation and a second field indicating the second identification is associated with the full-duplex operation.

12. The method of claim 10, further comprising:

determining that the first identification is associated with the half-duplex operation and that the second identification is associated with the full-duplex operation based at least in part on an order of the first identification and the second identification in the control signaling.

13. The method of claim 9, wherein the control signaling includes an information element (IE) that is an uplink control channel spatial relationship information IE, wherein the first one or more parameters and the second one or more parameters are identified in the uplink control channel spatial relationship information IE, and wherein the first one or more parameters includes a first open loop power control parameter for half-duplex operation, a first pathloss reference signal parameter for half-duplex operation, or both, and the second one or more parameters includes a second open loop power control parameter for full-duplex operation, a second pathloss reference signal parameter for full-duplex operation, or both.

14. The method of claim 9, wherein the control signaling includes an information element (IE) that is an uplink control channel spatial relationship information IE that includes a single set of parameters representative of both the first one or more parameters and the second one or more parameters, and wherein the single set of parameters includes an open loop power control parameter for both half-duplex operation and full-duplex operation, and a pathloss reference signal parameter for both half-duplex operation and full-duplex operation.

15. The method of claim 9, wherein the control signaling includes, in an uplink control channel power control information element (IE), a single set of open loop power control parameters that includes the first one or more parameters and the second one or more parameters, or a single set of pathloss reference signal parameters that includes the first one or more parameters and the second one or more parameters, or both.

16. The method of claim 9, wherein the control signaling includes, in an uplink control channel power control information element (IE), a first set of open loop power control parameters or a first set of pathloss reference signal parameters, or both, that include the first one or more parameters, and wherein the control signaling includes a second set of open loop power control parameters or a second set of pathloss reference signal parameters, or both, that include the second one or more parameters.

17. A user equipment (UE), comprising:

means for receiving an indication of a slot format configuration for a plurality of slots, wherein the plurality of slots includes one or more half-duplex slots and one or more full-duplex slots;

means for receiving control signaling that is indicative of a first one or more parameters associated with half-duplex operation and a second one or more parameters associated with full-duplex operation, wherein the first one or more parameters and the second one or more parameters are uplink control channel parameters that pertain to power control or spatial resource allocation; and means for transmitting, during an uplink resource within the plurality of slots, an uplink message in accordance with the first one or more parameters or the second one or more parameters based on the slot format configuration.

18. The UE of claim 17, wherein:

the control signaling includes an activating medium access control (MAC) control element (CE) that includes a first identification associated with the first one or more parameters and a second identification associated with the second one or more parameters;

the first identification is an uplink control channel spatial relationship information identification that is associated with half-duplex operation; and the second identification is an uplink control channel spatial relationship information identification that is associated with full-duplex operation.

19. The UE of claim 18, wherein the control signaling comprises a first field that indicates that the first identification is associated with the half-duplex operation and a second field indicating the second identification is associated with the full-duplex operation.

20. The UE of claim 18, further comprising:

means for determining that the first identification is associated with the half-duplex operation and that the second identification is associated with the full-duplex operation based at least in part on an order of the first identification and the second identification in the control signaling.

21. The UE of claim 17, wherein the control signaling includes an information element (IE) that is an uplink control channel spatial relationship information IE, wherein the first one or more parameters and the second one or more parameters are identified in the uplink control channel spatial relationship information IE, and wherein the first one or more parameters includes a first open loop power control parameter for half-duplex operation, a first pathloss reference signal parameter for half-duplex operation, or both, and the second one or more parameters includes a second open loop power control parameter for full-duplex operation, a second pathloss reference signal parameter for full-duplex operation, or both.

22. The UE of claim 17, wherein the control signaling includes an information element (IE) that is an uplink control channel spatial relationship information IE that includes a single set of parameters representative of both the first one or more parameters and the second one or more parameters, and wherein the single set of parameters includes an open loop power control parameter for both half-duplex operation and full-duplex operation, and a pathloss reference signal parameter for both half-duplex operation and full-duplex operation.

23. The UE of claim 17, wherein the control signaling includes, in an uplink control channel power control information element (IE), a single set of open loop power control parameters that includes the first one or more parameters and the second one or more parameters, or a single set of pathloss reference signal parameters that includes the first one or more parameters and the second one or more parameters, or both.

24. The UE of claim 17, wherein the control signaling includes, in an uplink control channel power control information element (IE), a first set of open loop power control parameters or a first set of pathloss reference signal parameters, or both, that include the first one or more parameters, and wherein the control signaling includes a second set of open loop power control parameters or a second set of pathloss reference signal parameters, or both, that include the second one or more parameters.

25. A non-transitory computer-readable medium storing code at a user equipment (UE), the code comprising instructions executable by at least one processor to:

receive an indication of a slot format configuration for a plurality of slots, wherein the plurality of slots includes one or more half-duplex slots and one or more full-duplex slots;

receive control signaling that is indicative of a first one or more parameters associated with half-duplex operation and a second one or more parameters associated with full-duplex operation, wherein the first one or more parameters and the second one or more parameters are uplink control channel parameters that pertain to power control or spatial resource allocation; and transmit, during an uplink resource within the plurality of slots, an uplink message in accordance with the first one or more parameters or the second one or more parameters based on the slot format configuration.

26. The non-transitory computer-readable medium storing code of claim 25, wherein:

the control signaling includes an activating medium access control (MAC) control element (CE) that includes a first identification associated with the first one or more parameters and a second identification associated with the second one or more parameters;

the first identification is an uplink control channel spatial relationship information identification that is associated with half-duplex operation; and the second identification is an uplink control channel spatial relationship information identification that is associated with full-duplex operation.

27. The non-transitory computer-readable medium storing code of claim 25, wherein the control signaling includes an information element (IE) that is an uplink control channel spatial relationship information IE, wherein the first one or more parameters and the second one or more parameters are identified in the uplink control channel spatial relationship information IE, and wherein the first one or more parameters includes a first open loop power control parameter for half-duplex operation, a first pathloss reference signal parameter for half-duplex operation, or both, and the second one or more parameters includes a second open loop power control parameter for full-duplex operation, a second pathloss reference signal parameter for full-duplex operation, or both.

28. The non-transitory computer-readable medium storing code of claim 25, wherein the control signaling includes an information element (IE) that is an uplink control channel spatial relationship information IE that includes a single set of parameters representative of both the first one or more parameters and the second one or more parameters, and wherein the single set of parameters includes an open loop power control parameter for both half-duplex operation and full-duplex operation, and a pathloss reference signal parameter for both half-duplex operation and full-duplex operation.

29. The non-transitory computer-readable medium storing code of claim 25, wherein the control signaling includes, in an uplink control channel power control information element (IE), a single set of open loop power control parameters that includes the first one or more parameters and the second one or more parameters, or a single set of pathloss reference signal parameters that includes the first one or more parameters and the second one or more parameters, or both.

30. The non-transitory computer-readable medium storing code of claim 25, wherein the control signaling includes, in an uplink control channel power control information element (IE), a first set of open loop power control parameters or a first set of pathloss reference signal parameters, or both, that include the first one or more parameters, and wherein the control signaling includes a second set of open loop power control parameters or a second set of pathloss reference signal parameters, or both, that include the second one or more parameters.

* * * * *